(12) United States Patent  (10) Patent No.: US 11,875,413 B2
Brown et al.  (45) Date of Patent: Jan. 16, 2024

(54) SYSTEM AND METHOD FOR PROPERTY CONDITION ANALYSIS

(71) Applicant: Cape Analytics, Inc., Mountain View, CA (US)

(72) Inventors: Kyler Brown, Mountain View, CA (US); Sarah Cebulski, Mountain View, CA (US)

(73) Assignee: Cape Analytics, Inc., Palo Alto, CA (US)

( * ) Notice: Subject to any disclaimer, the term of this patent is extended or adjusted under 35 U.S.C. 154(b) by 0 days.

(21) Appl. No.: 17/858,422

(22) Filed: Jul. 6, 2022

(65) Prior Publication Data

US 2023/0011777 A1  Jan. 12, 2023

Related U.S. Application Data

(60) Provisional application No. 63/249,200, filed on Sep. 28, 2021, provisional application No. 63/218,858, filed on Jul. 6, 2021.

(51) Int. Cl.
    *G06Q 40/08* (2012.01)
    *G06V 20/00* (2022.01)
(52) U.S. Cl.
    CPC .............. *G06Q 40/08* (2013.01); *G06V 20/39* (2022.01)
(58) Field of Classification Search
    None
    See application file for complete search history.

(56) References Cited

U.S. PATENT DOCUMENTS

| 5,633,946 | A  | 5/1997  | Lachinski et al. |
| 6,044,171 | A  | 3/2000  | Polyakov et al. |
| 6,249,616 | B1 | 6/2001  | Hashimoto |
| 7,327,902 | B2 | 2/2008  | Ritt et al. |
| 7,873,238 | B2 | 1/2011  | Schultz et al. |
| 7,945,117 | B2 | 5/2011  | Hermosillo et al. |
| 8,078,436 | B2 | 12/2011 | Pershing et al. |
| 8,081,841 | B2 | 12/2011 | Schultz et al. |
| 8,145,578 | B2 | 3/2012  | Pershing et al. |
| 8,170,840 | B2 | 5/2012  | Pershing |
| 8,207,964 | B1 | 6/2012  | Meadow et al. |
| 8,209,152 | B2 | 6/2012  | Pershing |
| 8,401,222 | B2 | 3/2013  | Thornberry et al. |
| 8,452,125 | B2 | 5/2013  | Schultz et al. |

(Continued)

FOREIGN PATENT DOCUMENTS

| CN | 101549596 B | 8/2012 |
| CN | 108197583 A | 6/2018 |

(Continued)

OTHER PUBLICATIONS

"Cape Analytics Now Detects Yard Debris From Geospatial Imagery", Dec. 18, 2019, https://capeanalytics.com/cape-analytics-now-detects-yard-debris-from-geospatial-imagery/.

(Continued)

*Primary Examiner* — Narayanswamy Subramanian
(74) *Attorney, Agent, or Firm* — Jeffrey Schox; Diana Lin

(57) ABSTRACT

In variants, the method for property condition analysis can include: determining a measurement, optionally determining a set of property attributes, determining a condition score, optionally providing the condition score, and optionally training a condition scoring model.

11 Claims, 11 Drawing Sheets

(56) References Cited

U.S. PATENT DOCUMENTS

| | | |
|---|---|---|
| 8,515,125 B2 | 8/2013 | Thornberry et al. |
| 8,531,472 B2 | 9/2013 | Freund et al. |
| 8,542,880 B2 | 9/2013 | Thornberry et al. |
| 8,655,070 B1 | 2/2014 | Yang et al. |
| 8,660,382 B2 | 2/2014 | Schultz et al. |
| 8,670,961 B2 | 3/2014 | Pershing et al. |
| 8,731,234 B1 | 5/2014 | Ciarcia et al. |
| 8,774,525 B2 | 7/2014 | Pershing |
| 8,818,770 B2 | 8/2014 | Pershing |
| 8,823,732 B2 | 9/2014 | Adams et al. |
| 8,825,454 B2 | 9/2014 | Pershing |
| 8,977,520 B2 | 3/2015 | Stephens et al. |
| 8,995,757 B1 | 3/2015 | Ciarcia et al. |
| 9,117,310 B2 | 8/2015 | Coene et al. |
| 9,129,376 B2 | 9/2015 | Pershing |
| 9,135,737 B2 | 9/2015 | Pershing |
| 9,141,880 B2 | 9/2015 | Ciarcia |
| 9,141,925 B2 | 9/2015 | Jung et al. |
| 9,147,287 B2 | 9/2015 | Ciarcia |
| 9,159,130 B2 | 10/2015 | Kneepkens |
| 9,159,164 B2 | 10/2015 | Ciarcia |
| 9,183,538 B2 | 11/2015 | Thornberry et al. |
| 9,244,589 B2 | 1/2016 | Thornberry et al. |
| 9,275,496 B2 | 3/2016 | Freund et al. |
| 9,292,913 B2 | 3/2016 | Schultz et al. |
| 9,329,749 B2 | 5/2016 | Thornberry et al. |
| 9,437,029 B2 | 9/2016 | Schultz et al. |
| 9,514,568 B2 | 12/2016 | Pershing et al. |
| 9,520,000 B2 | 12/2016 | Freund et al. |
| 9,536,148 B2* | 1/2017 | Gross .................... G06Q 50/16 |
| 9,542,738 B2 | 1/2017 | Schultz et al. |
| 9,576,201 B2 | 2/2017 | Wu et al. |
| 9,599,466 B2 | 3/2017 | Pershing |
| 9,743,046 B2 | 8/2017 | Giuffrida et al. |
| 9,753,950 B2 | 9/2017 | Schultz et al. |
| 9,805,489 B2 | 10/2017 | Schultz et al. |
| 9,836,882 B2 | 12/2017 | Freund et al. |
| 9,911,042 B1 | 3/2018 | Cardona et al. |
| 9,911,228 B2 | 3/2018 | Pershing et al. |
| 9,922,412 B1 | 3/2018 | Freeman et al. |
| 9,933,254 B2 | 4/2018 | Thornberry et al. |
| 9,933,257 B2 | 4/2018 | Pershing |
| 9,959,581 B2 | 5/2018 | Pershing |
| 9,959,653 B2 | 5/2018 | Schultz et al. |
| 9,972,126 B2 | 5/2018 | Freund et al. |
| 10,169,680 B1 | 1/2019 | Sachdeva et al. |
| 10,197,391 B2 | 2/2019 | Thornberry et al. |
| 10,229,532 B2 | 3/2019 | Freund et al. |
| 10,311,302 B2 | 6/2019 | Kottenstette et al. |
| 10,338,222 B2 | 7/2019 | Schultz et al. |
| 10,346,935 B2 | 7/2019 | Thornberry et al. |
| 10,402,676 B2 | 9/2019 | Wang et al. |
| 10,455,197 B2 | 10/2019 | Giuffrida et al. |
| 10,489,953 B2 | 11/2019 | Schultz et al. |
| 10,503,843 B2 | 12/2019 | Keane |
| 10,515,414 B2 | 12/2019 | Pershing |
| 10,528,960 B2 | 1/2020 | Pershing et al. |
| 10,529,029 B2* | 1/2020 | Okazaki .................. G06F 18/24 |
| 10,571,575 B2 | 2/2020 | Schultz et al. |
| 10,573,069 B2 | 2/2020 | Freund et al. |
| 10,648,800 B2 | 5/2020 | Thornberry et al. |
| 10,650,285 B1 | 5/2020 | Okazaki |
| 10,663,294 B2 | 5/2020 | Pershing et al. |
| 10,685,149 B2 | 6/2020 | Pershing |
| 10,796,189 B2 | 10/2020 | Wang et al. |
| 10,839,469 B2 | 11/2020 | Pershing |
| 10,937,178 B1 | 3/2021 | Srinivasan |
| 11,367,265 B2 | 6/2022 | Vianello et al. |
| 11,430,069 B1* | 8/2022 | Pedersen ................ G06N 20/00 |
| 11,488,255 B1* | 11/2022 | Mast ...................... G06Q 10/10 |
| 11,631,235 B2 | 4/2023 | Vianello et al. |
| 11,651,552 B2 | 5/2023 | Valladolid et al. |
| 11,676,298 B1 | 6/2023 | Portail et al. |
| 2003/0146913 A1 | 8/2003 | Shen et al. |
| 2005/0084178 A1 | 4/2005 | Lure et al. |
| 2005/0154657 A1 | 7/2005 | Kim et al. |
| 2006/0165267 A1 | 7/2006 | Wyman et al. |
| 2008/0255862 A1* | 10/2008 | Bailey .................... G06Q 40/06 |
| | | 707/999.107 |
| 2010/0014781 A1 | 1/2010 | Liu et al. |
| 2010/0111428 A1 | 5/2010 | Yu et al. |
| 2010/0217566 A1 | 8/2010 | Wayne et al. |
| 2012/0005109 A1 | 1/2012 | Stinson |
| 2012/0141014 A1 | 6/2012 | Lepikhin et al. |
| 2013/0054476 A1 | 2/2013 | Whelan |
| 2013/0121571 A1 | 5/2013 | Gokturk et al. |
| 2014/0015924 A1 | 1/2014 | Pryor |
| 2014/0139515 A1 | 5/2014 | Kim et al. |
| 2014/0180989 A1 | 6/2014 | Krizhevsky et al. |
| 2015/0088886 A1 | 3/2015 | Brouwer et al. |
| 2015/0131852 A1 | 5/2015 | Sweetser et al. |
| 2015/0269598 A1 | 9/2015 | Terrazas et al. |
| 2015/0286786 A1 | 10/2015 | El-Baz et al. |
| 2015/0302529 A1* | 10/2015 | Jagannathan .......... G06Q 40/08 |
| | | 705/4 |
| 2015/0347872 A1 | 12/2015 | Taylor et al. |
| 2016/0026900 A1 | 1/2016 | Ando |
| 2016/0048934 A1 | 2/2016 | Gross |
| 2016/0063516 A1 | 3/2016 | Terrazas et al. |
| 2016/0292800 A1 | 10/2016 | Smith |
| 2017/0032481 A1 | 2/2017 | Dsouza et al. |
| 2017/0270650 A1 | 9/2017 | Howe et al. |
| 2017/0352099 A1 | 12/2017 | Howe et al. |
| 2019/0188516 A1 | 6/2019 | Porter et al. |
| 2019/0213412 A1 | 7/2019 | Kottenstette et al. |
| 2019/0213438 A1 | 7/2019 | Jones et al. |
| 2019/0294647 A1 | 9/2019 | Brouwer et al. |
| 2019/0304026 A1 | 10/2019 | Lyman et al. |
| 2019/0354772 A1 | 11/2019 | Tasli et al. |
| 2020/0082168 A1 | 3/2020 | Fathi et al. |
| 2020/0134753 A1 | 4/2020 | Vickers |
| 2020/0151500 A1 | 5/2020 | Kossyk et al. |
| 2020/0160030 A1 | 5/2020 | Lavi |
| 2020/0226373 A1 | 7/2020 | Kottenstette et al. |
| 2020/0279653 A1 | 9/2020 | Hayward |
| 2021/0065340 A1 | 3/2021 | El-Khamy et al. |
| 2021/0089811 A1 | 3/2021 | Strong |
| 2021/0118165 A1 | 4/2021 | Strong |
| 2021/0133936 A1 | 5/2021 | Chandra et al. |
| 2021/0182529 A1 | 6/2021 | Singh et al. |
| 2021/0188312 A1 | 6/2021 | Shikari et al. |
| 2021/0199446 A1 | 7/2021 | Marschner et al. |
| 2021/0279852 A1* | 9/2021 | Jakka .................... H04N 23/631 |
| 2021/0312710 A1 | 10/2021 | Fathi et al. |
| 2022/0012518 A1 | 1/2022 | Sutherland |
| 2022/0292650 A1 | 9/2022 | Amirghodsi et al. |
| 2022/0405856 A1 | 12/2022 | Hedges et al. |
| 2023/0011777 A1 | 1/2023 | Brown et al. |
| 2023/0119132 A1 | 4/2023 | Cebulski et al. |
| 2023/0143198 A1 | 5/2023 | Vianello |
| 2023/0153931 A1 | 5/2023 | Lee |
| 2023/0237775 A1 | 7/2023 | Portail |

FOREIGN PATENT DOCUMENTS

| | | |
|---|---|---|
| CN | 108629287 A | 10/2018 |
| EP | 3340106 A1 | 6/2018 |
| WO | 2012115594 A1 | 8/2012 |

OTHER PUBLICATIONS

"CLIP: Connecting Text and Images", https://openai.com/blog/clip/, Jan. 5, 2021.

"HOA Lookup City of Goodyear GIS", https://www.arcgis.com/apps/webappviewer/index.html?id=816ddfbd119e49d4a74bb30cb4592c22, first downloaded May 31, 2023.

"The Real Value of Change Detection: A ChangeFinderTM Story Map", https://www.eagleview.com/newsroom/2018/02/real-value-change-detection/, EagleView US, Feb. 28, 2018.

"Unique Building Identifier (UBID)", Office of Energy Efficiency & Renewable Energy, https://www.energy.gov/eere/buildings/unique-

(56) References Cited

OTHER PUBLICATIONS building-identifier-ubid#:~:text=UBID, first downloaded Dec. 22, 2022.

Ali, Imtiaz, "Unsupervised video analysis for counting of wood in river during floods", Springer-Verlag, 2009, pp. 578-587 (year: 2009).

Carlberg, Matthew, et al., "Classifying Urban Landscape in Aerial Lidar Using 3D Shape Analysis", IEEE, 978-1-4244-5654-3, 2009, pp. 1701-1704 (Year: 2009).

Chen, Yixing, et al., "development of city—modeling", Energy and Buildings, 2019, pp. 252-265 (Year 2019).

Eigen, David, et al., "Depth Map Prediction from a Single Image using a Multi-Scale Deep Network", Jun. 9, 2014, XP055566498.

Friedland, Carol, et al., "Integrated Aerial-Based and ground Based-Scales", ResearchGate, Feb. 9, 2015, pp. 1-7 (Year: 2015).

Jiang, Shasha, et al., "Automatic urban debris zone extraction from post-hurricane very high-resolution satellite and aerial imagery", Geomatics, Natural Hazards and Risk, 7:3, 933-952, https://www.tandfonline.com/doi/full/10.1080/19475705.2014.1003417, 2016.

Kalinicheva, Ekaterina, et al., "Unsupervised Change Detection Analysis in Satellite Image Time Series using Deep Learning Combined with Graph-Based Approaches", https://hal.archives-ouvertes.fr/hal-02749683, Jun. 3, 2020.

Maire, Frederic, et al., "A Convolutional Neural Network for Automatic Analysis of Aerial Imagery", 2014 International Conference on Digital Image Computing: Techniques and Applications (DICTA), 8 pages (2014).

Mansouri, Babak, "Earthquake building damage detection using VHR Satellite data", Case study; Two villages near Sarpol-e Zahab), JSEE, Jul. 29, 2018, pp. 45-55 (Year: 2018).

Moussa, A., et al., "Man-made objects classification from satellite/aerial imagery using neural networks", International Archives of the Photogrammetry, Remote Sensing and Spatial Information Sciences—ISPRS Archives, 4 pages (2010).

Muhs, Sebastian, "Automatic delineation—maps", ELSEVIER, 2016, pp. 71-84 (Year: 2016).

Plank, Simon, "Rapid damage—Sentinel", Remote Sensing, May 28, 2014, pp. 4870-4906 (Year 2014).

Radford, Alec, et al., "Learning Transferable Visual Models From Natural Language Supervision", arXiv:2103.00020v1 [cs.CV] Feb. 26, 2021.

Tran, Kieu, "Applying Segmentation and Neural Networks to Detect and Quantify Marine Debris From Aerial w Images Captured by an Unmanned Aerial System and Mobile Device", Aug. 2018, pp. 1-70 (Year 2018).

Yu, Bailang, et al., "Automated derivation—method", Landscape and urban planning, 2020, pp. 210-219 (Year: 2010).

Zheng, Chuanxia, et al., "Pluralistic Image Completion", arXiv:1903.04227v2. Apr. 5, 2019.

* cited by examiner

SYSTEM AND METHOD FOR PROPERTY CONDITION ANALYSIS

CROSS-REFERENCE TO RELATED APPLICATIONS

This application claims the benefit of U.S. Provisional Application No. 63/249,200 filed on 28 Sep. 2021, and U.S. Provisional Application No. 63/218,858 filed on 6 Jul. 2021, each of which is incorporated herein in its entirety by this reference.

TECHNICAL FIELD

This invention relates generally to the computer vision field, and more specifically to a new and useful method for property condition analysis.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. OVERVIEW

Figure 1:
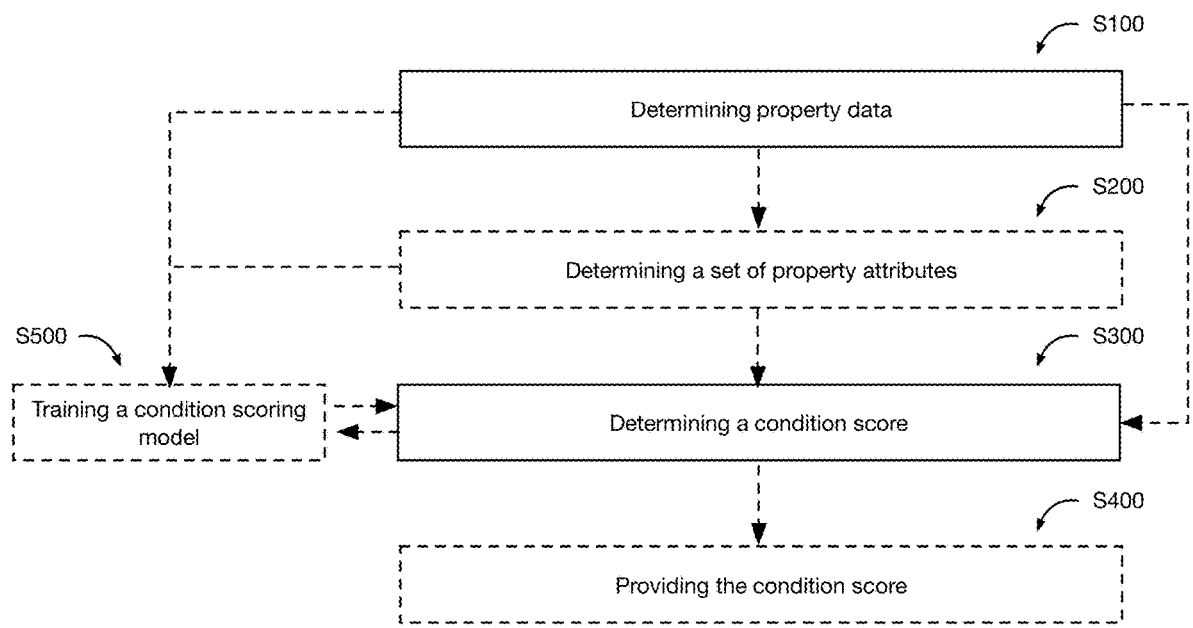
FIG. 1 is a schematic representation of a variant of the method.

As shown in FIG. 1, variants of the method can include: determining property data S100, optionally determining a set of property attributes S200, determining a condition score S300, optionally providing the condition score S400, and optionally training a condition scoring model S500. However, the method can additionally and/or alternatively include any other suitable elements.

In variants, the method can function to determine one or more condition scores for a property, a timeseries thereof, a comparison against neighboring and/or comparable properties (e.g., a relative comparison score between two properties, an average condition score across a region, etc.), and/or any other suitable metric. The metric can be used in valuation methods, such as to predict market value, detect valuation error, predict probability and/or severity of loss for mortgages and mortgage derivatives (e.g., predict loan defaults), predict repair costs, and/or otherwise used. The metric can be used in insurance methods, such as to deploy inspection resources (e.g., additional measurements, deploy inspector, etc.), price insurance, deploy contractors for repair, and/or otherwise used.

2. EXAMPLES

In a first example, the method can include: determining a property of interest; determining a set of property data for the property of interest, the set of property data including property measurements (e.g., remote imagery, such as remote RGB images, remote depth images, etc.) and optionally auxiliary data (e.g., property parcels, property descriptions, etc.); determining attribute values for each of a set of property attributes (e.g., roof condition, pool condition, vegetation state, damage state, condition change, etc.) based on the property data set; and determining a condition score, based on the set of attribute values for the property, using a condition model (e.g., a regression model, classifier, heuristics model, hybrid model thereof, etc.). The condition model can be trained on: property condition data (e.g., condition ratings), proxies for property conditions (e.g., insurance claim severity, insurance claim frequency, etc.), and/or other data. The condition model can be trained to predict the known condition score for a given property, trained to predict a set of condition scores for the property set having a similar distribution (e.g., within 5%, 10%, 20% etc. error) to that of the training data for the property set, and/or otherwise trained.

In a second example, the method can include: processing the measurement directly through the condition scoring model, and outputting the condition score for the measurement (e.g., directly predicting the condition score from the property measurements). In this example, the condition scoring model can be a neural network, a clustering model, a regression, a classifier, a heuristic model, and/or any other suitable algorithm.

However, the method can be otherwise performed.

3. TECHNICAL ADVANTAGES

Variants of the technology can confer several benefits over conventional systems and benefits.

First, traditional property condition metrics are qualitative and/or subjective. For example, an inspector subjectively decides whether the lawn looks healthy, or whether or not the water feature looks clean. This can result in metrics that are noisy, not normalized (e.g., not homogeneous), subject to bias, and/or unpredictive of a property's value. Variants of the technology can determine a condition score that is quantitative, normalized (e.g., relative to the rest of the property population), debiased, predictive of a property parameter (e.g., predictive of market value, insurance risk, maintenance and/or repair cost, etc.), and/or explainable (e.g., objectively explainable) by automatically predicting the condition score based on attributes extracted from objective measurements. For example, variants of the technology can automatically determine a condition score for a given property based on attribute values extracted from a set of property images. In specific examples, the models (e.g., condition scoring model, attribute models, etc.) can be trained on debiased and/or normalized training data.

Second, variants of the technology can leverage models trained on proxies for property condition, instead of or in addition to manually-assigned condition metrics. This can result in a statistically significant (and, in variants, less biased) corpus of training data, spanning a larger proportion of the overall property population. In examples, property condition proxies can include: automated valuation error, insurance claim amount (e.g., claim severity), claim frequency, foreclosure rate, default rate, and/or any other suitable proxy.

Third, conventional property condition metrics can be unexplainable, since the factors being considered and the relative importance of said factors are not explicitly expressed by the inspectors. Variants of the technology can be more interpretable and/or explainable by identifying the attributes having a high contribution to the resultant score, and/or by using semantic attributes (e.g., wherein the attribute values are human-readable and/or have semantic meaning).

Fourth, variants of the technology can increase condition score accuracy by leveraging parcel data (e.g., parcel boundary) for a property. For example, the parcel data can be used to determine a segmented measurement for the property (e.g., isolated to the property, a measurement that has one or more segments representative of different objects of interest, etc.) that is provided to the attribute model and/or condition scoring model, as additional information provided to the attribute model and/or condition scoring model (e.g., to focus the model on property-related pixels), and/or otherwise used.

However, the technology can confer any other suitable benefits.

4. SYSTEM

Figure 2:
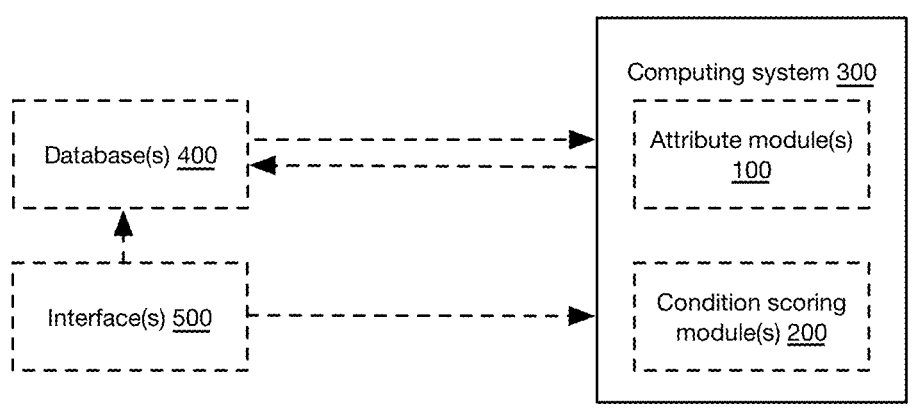
FIG. 2 is a schematic representation of a variant of the system.

As shown in FIG. 2, the system can include one or more condition scoring modules 200, and can optionally include one or more: attribute modules 100, auxiliary modules, and/or any other set of models.

In variants, the system can function to determine one or more condition scores for a property based on one or more measurements depicting the property.

The property can be or include: a parcel (e.g., land), a property component or set or segment thereof, and/or otherwise defined. For example, the property can include both the underlying land and improvements (e.g., built structures, fixtures, etc.) affixed to the land, only include the underlying land, or only include a subset of the improvements (e.g., only the primary building). Property components can include: built structures (e.g., primary structure, accessory structure, deck, pool, etc.); subcomponents of the built structures (e.g., roof, siding, framing, flooring, living space, bedrooms, bathrooms, garages, foundation, HVAC systems, solar panels, slides, diving board, etc.); permanent improvements (e.g., pavement, statutes, fences, etc.); temporary improvements or objects (e.g., trampoline); vegetation (e.g., tree, flammable vegetation, lawn, etc.); land subregions (e.g., driveway, sidewalk, lawn, backyard, front yard, wildland, etc.); debris; and/or any other suitable component. The property and/or components thereof are preferably physical, but can alternatively be virtual. The property can be identified by one or more property identifiers. A property identifier (property ID) can include: geographic coordinates, an address, a parcel identifier, a block/lot identifier, a planning application identifier, a municipal identifier (e.g., determined based on the ZIP, ZIP+4, city, state, etc.), and/or any other identifier. The property identifier can be used to retrieve property data, such as parcel information (e.g., parcel boundary, parcel location, parcel area, etc.), property measurements, and/or other data. The property identifier can additionally or alternatively be used to identify a property component, such as a primary building or secondary building, and/or otherwise used.

The measurements can function as the basis for condition score determination, attribute extraction, and/or otherwise used. A measurement preferably records a parameter of a property (e.g., the property of interest), but can additionally or alternatively record a parameter the surrounding geographic region, adjacent properties, and/or other features. The parameter can be: the visual appearance (e.g., wherein the measurement depicts the property or surrounding geographic region), a geometry (e.g., depth), a chemical composition, audio, and/or any other parameter. The measurement can be: 2D, 3D or geometric, and/or have any other set of dimensions. Examples of measurements can include: images (e.g., 2D images, 3D images, etc.), surface models (e.g., digital surface models (DSM), digital elevation models (DEM), digital terrain models (DTM), etc.), point clouds (e.g., generated from LIDAR, RADAR, stereoscopic imagery, etc.), depth maps, depth images, virtual models (e.g., geometric models, mesh models), audio, video, and/or any other suitable measurement. Examples of images that can be used include: an image captured in color (e.g., RGB, hyperspectral, multispectral, etc.), black and white, grayscale, IR, NIR, UV, thermal, and/or captured using any other suitable wavelength; images with depth values associated with one or more pixels (e.g., DSM, DEM, etc.); and/or other images. The measurements can include: remote measurements (e.g., aerial imagery, such as satellite imagery, balloon imagery, drone imagery, etc.), local or on-site measurements (e.g., sampled by a user, streetside measurements, etc.), and/or sampled at any other proximity to the property. The measurements can be exterior measurements, interior measurements, and/or any other measurement. The remote measurements can be measurements sampled more than a threshold distance away from the property, such as more than 100 ft, 500 ft, 1,000 ft, any range therein, and/or sampled any other distance away from the property. Measurements can be: aerial imagery (e.g., captured from an aircraft, such as a plane, helicopter, balloon, kite, etc.), satellite imagery (e.g., captured from a satellite), drone imagery (e.g., captured from a drone), on-site imagery (e.g., street view image, aerial image captured within a predetermined distance to a property, such as using a drone, etc.), interior imagery, exterior imagery, oblique imagery, and/or any other suitable measurement. The measurements can include: top-down measurements (e.g., nadir measurements, panoptic measurements, etc.), side measurements (e.g., elevation views, street measurements, etc.), angled measurements (e.g., at an angle to vertical, orthographic measurements, isometric views, etc.), and/or sampled from any other pose or angle relative to the property. The measurements can be a full-frame measurement, a segment of the measurement (e.g., the segment depicting the property, such as that depicting the parcel and/or only the parcel; the segment depicting a geographic region a predetermined distance away from the property; etc.), a merged measurement (e.g., a mosaic of multiple measurements), orthorectified, and/or otherwise processed.

One or more condition scores can be determined for each property. The condition score is preferably an exterior condition score, but can alternatively be an overall condition score, an interior condition score, and/or a score for any other suitable portion of a property and/or component. The condition score can be discrete, continuous, binary, multiclass, numerical, categorical, and/or otherwise structured.

The condition score can be a label, or not be a label. The condition score can be a multi-class label (e.g., severe, poor, fair, good, excellent, etc.), a binary label (e.g., good or poor corresponding to 1 or 0), a value (e.g., 0-5, 0-10, 0-100, etc.; an integer value, a decimal value, etc.), and/or any other suitable score. The condition score can be associated with time data (e.g., from the underlying measurement timestamp, value determination timestamp, etc.), a hazard event (e.g., before a hazard event, after a hazard event, etc.; wherein hazard events can include wildfires, hail, floods, and/or other hazards), a mitigation event (e.g., a real mitigation event, a hypothetical mitigation event, etc.; wherein mitigations can include: property repaved, vegetation removal, and/or other mitigations), an uncertainty parameter, and/or any other suitable metadata. The condition score can be associated with a single timestep, a single time window, multiple timestamps (e.g., condition score change over time), and/or have any other temporal relationship. The condition score can optionally be associated with an uncertainty parameter. Uncertainty parameters can include variance values, a confidence metric, and/or any other uncertainty metric.

Figure 4:
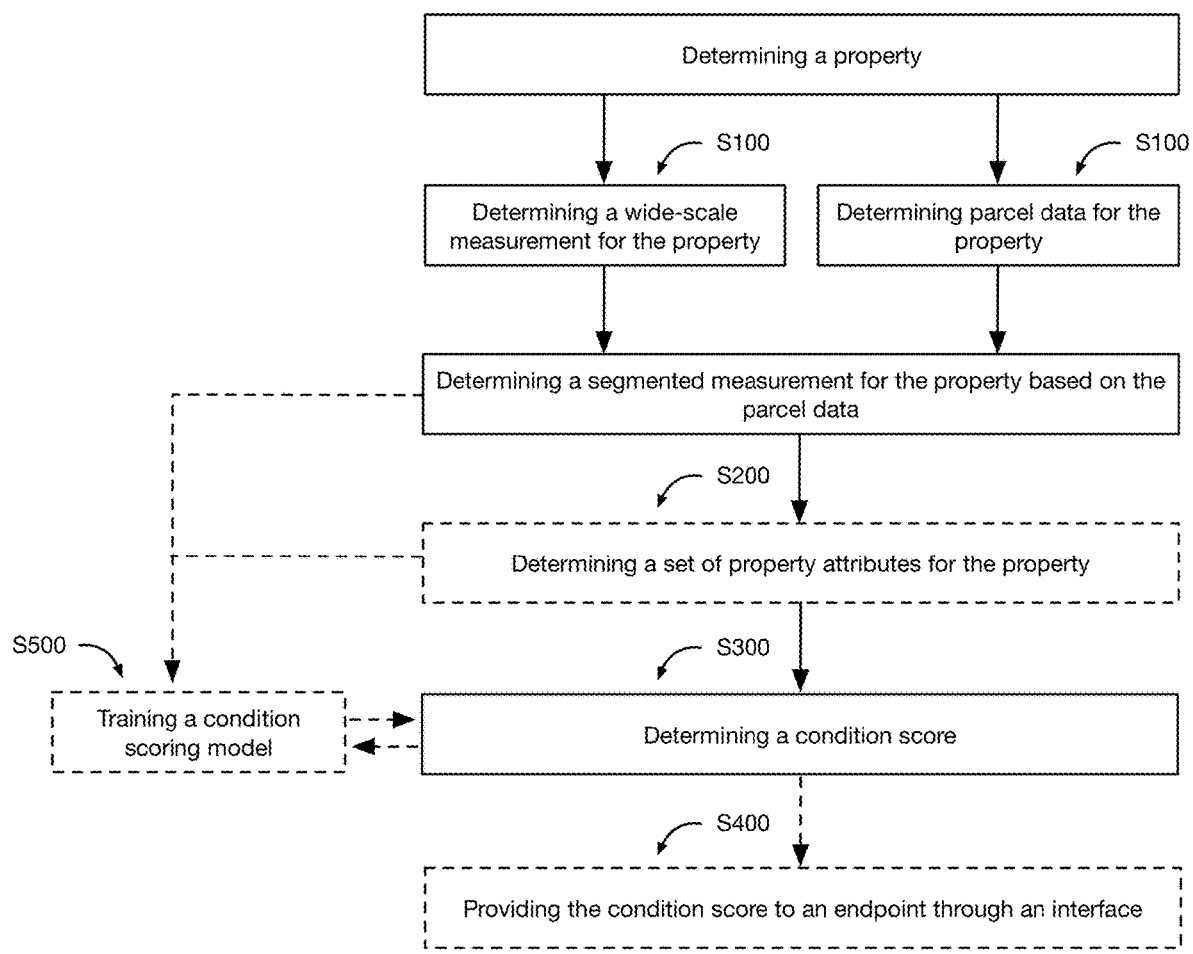
FIG. 4 is an illustrative example of a variant of the method.
Figure 8A:
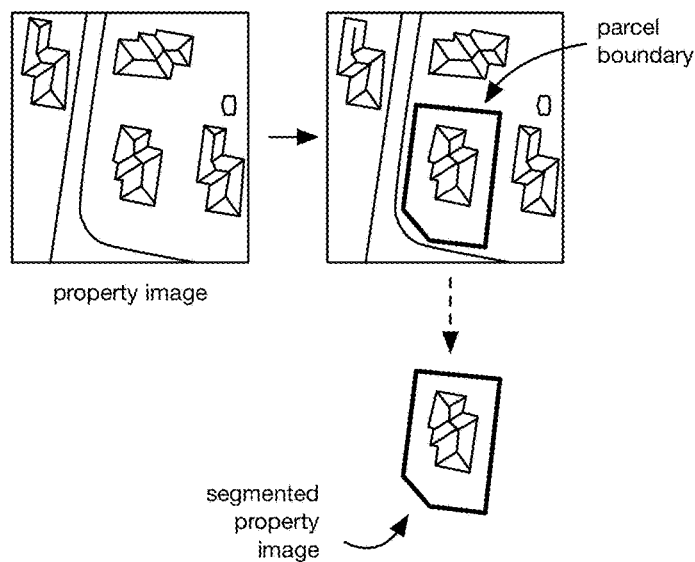
FIGS. 8A-8B are illustrative examples of using parcel data.

The property is preferably associated with parcel data (e.g., parcel boundary, parcel mask, etc.), but can additionally and/or alternatively be associated with a property boundary (e.g., a land boundary), a geofence, a region, a mask, and/or any other suitable information. The parcel data preferably defines a boundary of a parcel, but can additionally and/or alternatively define other parcel parameters. The parcel data can be georeferenced (e.g., aligned with an external geographic coordinate system), referenced to a measurement (e.g., referenced to image coordinates), and/or otherwise referenced. The parcel data can be used: to limit condition analysis to the property of interest (e.g., such that the features, attributes, and/or conditions of a neighboring property is not imputed onto the instant property); to reduce the computational load required to analyze the property (e.g., by limiting the region or number of processed pixels to that encompassed by the parcel); to determine a measurement segment isolating the property (e.g., wherein the measurement segment encompasses or is encompassed by the parcel data), wherein the measurement segment is used as the measurement ingested by one or more attribute models and/or condition scoring model (e.g., limit the portions of the measurement considered by a model, examples shown in FIG. 4 and FIG. 8A, etc.); as additional information provided to the one or more attribute models and/or condition scoring model (e.g., as additional information to focus a model); to identify which property is associated with the predicted condition score; and/or be otherwise used.

The property can be associated with auxiliary data. Examples of auxiliary data include: property descriptions, permit data, insurance loss data, inspection data, appraisal data, broker price opinion data, property valuations, property attribute and/or component data (e.g., values), and/or any other suitable data. The auxiliary data can be used to: determine attribute values, increase the accuracy of the condition score, select which attributes should be used for condition score determination, and/or otherwise used.

The property can be associated with attribute values for attributes. Attributes can be property components, features (e.g., feature vector, mesh, mask, point cloud, pixels, voxels, any other parameter extracted from a measurement), any parameter associated with a property component (e.g., property component characteristics), and/or higher-level summary data extracted from property components and/or features. Attributes associated with a property component can include: location (e.g., centroid location), boundary, distance (e.g., to another property component, to a geographic landmark, to wildland, setback distance, etc.), material, type, presence, count, density, geometry parameters (e.g., footprint and/or area, area ratios and/or percentages, complexity, number of facets and/or other elements, slope, height, etc.), condition (e.g., a condition rating), hazard context, geographic context, vegetation context (e.g., based on an area larger than the property), weather context, terrain context, historical construction information, ratios or comparisons therebetween, counts, and/or any other parameter associated with one or more property components.

Property attributes can include: structural attributes (e.g., for a primary structure, accessory structure, neighboring structure, etc.), location (e.g., parcel centroid, structure centroid, roof centroid, etc.), property type (e.g., single family, lease, vacant land, multifamily, duplex, etc.), property component parameters (e.g., area, enclosure, presence, structure type, count, material, construction type, area condition, spacing, etc.; for pools, porches, decks, patios, fencing, etc.), storage (e.g., presence of a garage, carport, etc.), permanent or semi-permanent improvements (e.g., solar panel presence, count, type, arrangement, and/or other solar panel parameters; HVAC presence, count, footprint, type, location, and/or other parameters; etc.), temporary improvement parameters (e.g., presence, area, location, etc. of trampolines, playsets, etc.), pavement parameters (e.g., paved area, percent illuminated, etc.), foundation elevation, terrain parameters (e.g., parcel slope, surrounding terrain information, etc.), and/or any other attribute that remains substantially static after built structure construction.

Structural attributes can include: the structure footprint, structure density, count, structure class/type, proximity information and/or setback distance (e.g., relative to a primary structure, relative to another property component, etc.), building height, parcel area, number of bedrooms, number of bathrooms, number of stories, roof parameters (e.g., area, area relative to structure area, geometry/shape, slope, complexity, number of facets, height, material, roof extension, solar panel presence, solar panel area, etc.), framing parameters (e.g., material), flooring (e.g., floor type), historical construction information (e.g., year built, year updated/improved/expanded, etc.), area of living space, ratios or comparisons therebetween, and/or other attribute descriptive of the physical property construction.

Condition-related attributes can include: roof condition (e.g., tarp presence, material degradation, rust, missing or peeling material, sealing, natural and/or unnatural discoloration, defects, loose organic matter, ponding, patching, streaking, etc.), accessory structure condition, yard debris and/or lot debris (e.g., presence, coverage, ratio of coverage, etc.), lawn condition, pool condition, driveway condition, tree parameters (e.g., overhang information, height, etc.), vegetation parameters (e.g., coverage, density, setback, location within one or more zones relative to the property), presence of vent coverings (e.g., ember-proof vent coverings), structure condition, occlusion (e.g., pool occlusion, roof occlusion, etc.), pavement condition (e.g., percent of paved area that is deteriorated), resource usage (e.g., energy usage, gas usage, etc.), conditions of other property components, and/or other parameters that are variable and/or controllable by a resident. Condition-related attributes can be a rating for a single property component, a minimum rating across multiple property components, a weighted rating across multiple property components, and/or any other individual or aggregate value.

Other examples of property attributes can include attributes as disclosed in U.S. application Ser. No. 17/529,836 filed on 18 Nov. 2021, U.S. application Ser. No. 17/475,523 filed on 15 Sep. 2021, and/or U.S. application Ser. No. 17/749,385 filed on 20 May 2022, each of which is incorporated herein in its entirety by this reference. However, other property attributes can be determined in any other manner.

Attribute values can be discrete, continuous, binary, multiclass, and/or otherwise structured. The attribute values can be associated with time data (e.g., from the underlying measurement timestamp, value determination timestamp, etc.), a hazard event, a mitigation event (e.g., a real mitigation event, a hypothetical mitigation event, etc.), an uncertainty parameter, and/or any other suitable metadata. The attribute values can be associated with a single timestep, a single time window, across time (e.g., attribute value change over time), and/or otherwise related. Attribute values can optionally be associated with an uncertainty parameter. Uncertainty parameters can include variance values, a confidence metric, and/or any other uncertainty metric.

The modules of the system can function to: process the measurements (e.g., raw measurements, segmented measurements, etc.), extract property attributes, determine condition scores, and/or perform any other suitable functionalities. The system can include one or more models of the same or different type. The models can be or include: a neural network (e.g., CNN, DNN, etc.), an equation (e.g., weighted equations), a Supersparse Linear Integer Model (SLIM), a generalized additive model with pairwise interactions (GA2Ms), leverage regression, classification, rules, heuristics, instance-based methods (e.g., nearest neighbor), regularization methods (e.g., ridge regression), decision trees, Bayesian methods (e.g., Naïve Bayes, Markov, etc.), kernel methods, probability, deterministics, support vectors, and/or any other suitable model or methodology. The classifiers (e.g., classification models) can include machine learning models, sets of rules, heuristics, and/or any other suitable classification model. The classification models can be neural networks (e.g., DNN, CNN, RNN, etc.), decision trees, SVMs, and/or any other suitable machine learning model. The classification models can be semantic segmentation models, instance-based segmentation models, and/or any other segmentation model. The models can be trained on: synthetic data, manually-labelled data, insurance claims data, real estate data (e.g., sales data, inspection data, appraisal data, broker price opinion data, permit data, etc.), and/or any other suitable ground truth training data set. The models can be trained using supervised learning, unsupervised learning, semi-supervised learning, single-shot learning, zero-shot learning, and/or any other suitable learning technique.

The modules of the system can include one or more: attribute modules 100, condition scoring modules 200, and/or any other suitable modules.

The system can include one or more attribute modules 100 configured to determine attribute values for one or more property attributes based on a set of data for a property (property data set). In a first variant, the system includes a different attribute module 100 for each attribute of interest. In a second variant, the system includes a single attribute module 100 (e.g., a multiclass classifier) that determines (e.g., predicts) values for each of a set of attributes. However, any other number of attribute modules 100, configured in any other manner, can be used.

The attribute module(s) 100 (e.g., attribute model) can determine the attribute values based on a property data set for a property. The property data set can include: measurements of the property, auxiliary data for the property, parcel data for the property, and/or any other suitable data for the property. The property data within the property data set can be associated with a common timestamp, with a common time frame (e.g., all determined within the same week, month, quarter, year, and/or other timeframe), with different timeframes, and/or otherwise temporally related.

The attribute values can be determined: based on a single property, based on a larger geographic context (e.g., based on a region larger than the property parcel size), and/or otherwise determined.

Each attribute model preferably outputs values for one or more property attributes and/or components, but can additionally or alternatively output feature segments, property measurements, property identifiers, uncertainty parameters (e.g., a confidence score for each attribute value prediction, etc.), and/or any other suitable information. For example, a first attribute model can determine a roof condition score, a second model can determine a paved surface score, a third model can determine a yard debris score, and a fourth model can determine a vegetation coverage score (e.g., for each of a set of regions surrounding a primary structure of a property).

The attribute modules 100 can be or include: a neural network (e.g., CNN, DNN, etc.), an equation (e.g., weighted equations), leverage regression, classification, rules, heuristics, instance-based methods (e.g., nearest neighbor), regularization methods (e.g., ridge regression), decision trees, Bayesian methods (e.g., Naïve Bayes, Markov, etc.), kernel methods, probability, deterministics, support vectors, heuristics, classification models (e.g., binary classifiers, multiclass classifiers, semantic segmentation models, instance-based segmentation models, etc.), regression models, object detectors, any computer vision and/or machine learning method, and/or any other suitable model or methodology. Different attribute modules 100 can use the same or different methods.

The attribute modules 100 are preferably trained to predict a set of ground truth attribute values for each of a set of training properties, given the training property data sets associated with each training property of the set, but can additionally or alternatively be tuned to predict a comparable distribution of attribute values across the training property set, and/or otherwise learned or determined. The training data used to train each attribute module 100 is preferably different from each other (e.g., different training targets, different training properties, etc.), but can additionally or alternatively be the same (e.g., the same property data modalities, the same training properties, etc.). The training data used to train the attribute modules 100 is preferably different from that used to determine the condition scoring model (e.g., different training targets, different inputs, etc.), but can alternatively be the same.

The attribute module 100 can be specific to: a use case (e.g., real estate valuation, insurance loss estimation, maintenance/repair cost, etc.), a measurement type (e.g., 2D measurement, 3D measurement, interior measurement, exterior measurement, etc.), a neighborhood, a geographic region (e.g., a continent, a country, a state, a county, a city, a zip code, a street, a school district, etc.), a property class (e.g., single-family home, multi-family home, a house, an apartment, a condominium, etc.), a timeframe (e.g., a season, a week of the year, a month, a specific set of dates, etc.), a terrain (e.g., forest, desert, etc.), a residential area classification (e.g., urban, suburban, rural, etc.), a zoning classification (e.g., residential area, industrial area, commercial area, etc.), and/or be otherwise specific. Additionally and/or alternatively, the attribute module 100 can be generic among: use cases, measurement types, neighborhoods, geographic regions, property classes, timeframes, terrains, residential area classifications, zoning classifications, and/or be otherwise generic.

The attribute values can be determined by: extracting features (e.g., influential features) from property measurements and determining the attribute values based on the extracted feature values, extracting attribute values directly from property measurements, retrieving values from a database 400 or a third party source (e.g., third-party database, real estate listing service database, city permitting database, historical weather and/or hazard database, tax assessor database, etc.), using a predetermined value, calculating a value (e.g., from an extracted value and a scaling factor, etc.), and/or otherwise determined. In variants, the attribute model can extract feature values (e.g., feature vectors) from all or a portion of the property data within the property data set (e.g., from a segment of a property measurement; from the measurements, parcel data, and property description but not the permit data; etc.), and determine the attribute values for the property's attribute based on the feature values. In an illustrative example, the attribute model can extract visual features from an image (e.g., RGB image, depth measurement, etc.) of the property and determine a condition of a property component (e.g., a roof condition) for the property based on the extracted visual features. However, the attribute values can be otherwise determined.

However, the attribute module 100 can be otherwise configured.

The condition scoring module 200 (e.g., condition scoring model) can be configured to determine a condition score based on one or more property measurements and/or one or more property attributes. The condition scoring model preferably outputs a condition score for the property and/or individual property components, but can additionally or alternatively output property measurements, property identifiers, uncertainty parameters (e.g., a confidence score for the output condition score, an uncertainty score derived from the uncertainty scores for the attribute value predictions, etc.), and/or any other suitable information.

The condition scoring module 200 preferably determines the condition score based on a set of attribute values for the property, but can additionally or alternatively determine the condition score based on property measurements, parcel data, auxiliary data (e.g., property description, property description vector, etc.), and/or any other suitable information. The condition scoring module 200 can be or include: a neural network (e.g., CNN, DNN, etc.), an equation (e.g., weighted equations), leverage regression, classification, rules, heuristics, instance-based methods (e.g., nearest neighbor), regularization methods (e.g., ridge regression), decision trees, Bayesian methods (e.g., Naïve Bayes, Markov, etc.), kernel methods, probability, deterministics, support vectors, heuristics, classification models (e.g., binary classifiers, multiclass classifiers, semantic segmentation models, instance-based segmentation models, etc.), regression models, object detectors, any computer vision and/or machine learning method, and/or any other suitable model or methodology. Different condition scoring modules 200 can use the same or different methods. The condition scoring module 200 is preferably a different model from the attribute modules 100, but can alternatively be the same.

The condition scoring module 200 can include a single model, include a set of submodels (e.g., a cascade of submodels, an ensemble of submodels, etc.), include the attribute modules 100, be separate from the attribute modules 100 (e.g., be a downstream model that ingests attribute module outputs), and/or be otherwise constructed. The submodels are preferably serially executed, but can additionally and/or alternatively be concurrently executed (e.g., wherein the outputs are compared and/or treated as condition score votes) or executed in any other order. Each submodel of the set of submodels can be selected (e.g., based on property attribute values, based on auxiliary data, etc.) for execution, always executed, executed based on a schedule (e.g., periodically), randomly executed, and/or otherwise used. One submodel of the set can be executed, multiple submodels of the set can be executed, and/or any other suitable number of submodels can be executed. Submodels within the set can be of the same or different type. Submodels can include: a heuristics submodel, a regression submodel, a neural network submodel, a classification submodel, a combination thereof, and/or any other suitable submodel. In a first example, the condition scoring module 200 includes a heuristics submodel that ingests a set of property attribute values and outputs a condition label. In a second example, the condition scoring module 200 includes a regression submodel that ingests a set of property attribute values and outputs a condition score. The condition score can optionally be converted to a condition label. In a third example, the condition scoring module 200 includes a heuristics submodel and a regression submodel; example shown in FIG. 9. The heuristics submodel ingests the set of property attribute values and outputs a condition label only if the set of property attribute values satisfy a set of conditions defined by the heuristics submodel. The condition label associated with the satisfied set of conditions is the determined condition label. However, if the set of property attribute values does not satisfy the set of conditions defined by the heuristics submodel, a set of property attribute values (e.g., the same or a different set of attribute values for the property) are passed to the regression submodel, wherein the regression submodel determines a condition score based on the property attribute value set. The condition score can optionally be converted to a condition label (e.g., when the condition score is numeric or a relative comparison).

The condition scoring module 200 is preferably trained to predict condition scores for the set of training properties, wherein the predicted condition scores collectively have a distribution parameter similar to the distribution parameter for the set of training target values, but can additionally or alternatively be trained to predict a set of known condition scores for each of a set of training properties, given the training property data sets associated with each training property of the set; be trained to predict the property's percentile within the set of training properties (e.g., wherein the target percentile is determined based on the training target values); and/or otherwise learned or determined. The distribution parameter can be: the distribution shape, the spread, the mean, the median, the mode, percentile range (e.g., for a given property), and/or any other parameter of the distribution. For example, the condition scoring module 200 can be trained to predict a set of condition scores, for the set of training properties, that has a distribution of values that is similar (e.g., within 1%, 5%, 10%, 30%, 50%, less than 50%, etc.) to a distribution of training target values for the training property set. The training targets are preferably of a different modality from that of the condition score (e.g., the training targets are not condition scores), but can alternatively be condition scores. The training targets are preferably proxies for the condition score (e.g., positively correlated with the property condition; negatively correlated with the property condition; have a known correlation with the property condition; etc.), but can alternatively be otherwise related to the property condition. The training data used to train the condition scoring modules 200 is preferably different from that used to determine the attribute models (e.g., different training targets, different inputs, etc.), but can alternatively be the same.

The condition scoring module 200 can be specific to: a use case (e.g., real estate valuation, insurance loss estimation, maintenance/repair cost, etc.), a measurement type (e.g., 2D measurement, 3D measurement, interior measurement, exterior measurement, etc.), a neighborhood, a geographic region (e.g., a continent, a country, a state, a county, a city, a zip code, a street, a school district, etc.), a property class (e.g., single-family home, multi-family home, a house, an apartment, a condominium, etc.), a timeframe (e.g., a season, a week of the year, a month, a specific set of dates, etc.), a terrain (e.g., forest, desert, etc.), a residential area classification (e.g., urban, suburban, rural, etc.), a zoning classification (e.g., residential area, industrial area, commercial area, etc.), and/or be otherwise specific. Additionally and/or alternatively, the condition scoring module 200 can be generic among: use cases, measurement types, neighborhoods, geographic regions, property classes, timeframes, terrains, residential area classifications, zoning classifications, and/or be otherwise generic.

In a first variant, the condition score can be determined based on a set of attribute values for the property, wherein the attribute values are determined from a property data set for the property (e.g., determined based on features extracted from the property data). In a second variant, the condition score is determined by extracting features (e.g., influential features) from the property data (e.g., the property measurements) and determining the condition score based on the extracted feature values. In a third variant, the condition score can be predetermined by a database 400 or a third party source (e.g., real estate listing service database, city permitting database, tax assessor database, inspection database, appraiser database, broker price opinion database, etc.) and/or preset, wherein the predetermined condition score is validated by the condition scoring module 200. The condition score can be: based on a single property, based on a larger geographic context (e.g., based on a region larger than the property parcel size), and/or otherwise determined.

However, the condition scoring module 200 can be otherwise configured.

However, the system can include any other set of modules.

The system can additionally or alternatively include a computing system (e.g., processing system, platform, etc.) 300, a set of databases 400, a set of interfaces 500, and/or any other suitable components.

The computing system 300 can function to execute all or portions of the method, and/or perform any other suitable functionality. The computing system 300 can include a remote computing system (e.g., one or more servers, one or more platforms, etc.), a user device (e.g., smartphone, laptop, desktop, tablet, etc.), and/or other computing system. The computing system 300 can be used with a user interface 500 (e.g., mobile application, web application, desktop application, API, database, etc.) or not be used with a user interface. The user interface 500 can be used to: receive and/or input property identifiers and/or property requests, present attribute and/or property analysis results, present condition scores or a timeseries thereof, and/or otherwise used. In examples, the computing system 300 can include: a remote computing system and a user device that interfaces with the remote computing system via an API, a remote computing system that interfaces with a third-party via an API, and/or otherwise be used with a user interface. The computing system 300 can optionally include one or more third-party interfaces (e.g., APIs, etc.), which function to interface with third party systems (e.g., databases) to retrieve information, receive requests, and/or otherwise interact with third party systems.

The databases 400 can function to store the measurements, condition scores, attribute values, parcel data (e.g., parcel masks, parcel boundaries, etc.), auxiliary data (e.g., property descriptions, permit data, etc.), and/or any other information. The database 400 can be a SQL database, NoSQL database, and/or any other suitable database. The database 400 can be queried to retrieve the measurements, condition scores, attributes, parcel data, auxiliary data, and/or any other suitable information used to perform the method. The query can include geographic coordinates, an address, and/or any other property identifier (e.g., used to identify a parcel and/or group of parcels).

However, the system can include any other suitable components.

5. METHOD

The method for property condition analysis can include: determining property data S100, optionally determining a set of property attributes S200, determining a condition score S300, optionally providing the condition score S400, and optionally training a condition scoring model S500. However, the method can additionally and/or alternatively include any other suitable elements. However, the method can include any other set of processes.

All of (or a portion thereof) the method can be performed by the system disclosed above, or by any other suitable system. The method can be performed in response to a receiving a request (e.g., for a measurement, for a property, etc.), periodically (e.g., for a measurement, for a property, etc.), in response to receiving an updated measurement for a property, randomly, and/or performed at any other suitable time.

The method can be performed for: a single property, multiple properties, and/or any other suitable number of properties. The method can be performed for one or more properties: concurrently, serially, upon request, and/or at any other time. In a first example, the method can be performed for a property responsive to receipt of a request (e.g., property analysis request). In a second example, the method can be performed for multiple properties as a batch. However, the method can be performed in any other order for any suitable set of properties.

5.1. Determining Property Data S100.

Determining property data S100 functions to determine property data for a property that can be used to extract information indicative of the property's actual condition. S100 is preferably performed before S200, but can additionally and/or alternatively be performed concurrently with S200, after S200, periodically, randomly, and/or any other suitable time. S100 can be performed: responsive to receipt of a request (e.g., for analysis of a property of interest), responsive to notification that the property data is available (e.g., new measurement, updated measurement, new auxiliary data, updated auxiliary data, etc.), and/or at any other time. The property data can be: received as part of a request (e.g., API request), retrieved from a database (e.g., local database, third-party database, etc.), received from a third-party (e.g., image provider), determined based on a property identifier (e.g., geographic descriptor, address, geocoordinates, parcel identifier, municipal identifier), and/or otherwise determined.

The property data can include: one or more measurements depicting a property (e.g., depicting geographic region that the property is located within), parcel data (e.g., parcel boundary, geofence, etc.), auxiliary data (e.g., property description), and/or any other suitable information. The measurement can be: one measurement, multiple measurements, and/or any other suitable number of measurements of the same or different type (e.g., domain or modality). The measurement can be a 2D measurement, 3D measurement, appearance-based measurement (e.g., RGB measurement), geometric measurement (e.g., DSM, DEM, etc.), and/or any other type of measurement. The measurement is preferably a measurement as described above, but can additionally and/or alternatively be any other suitable measurement. The measurement is preferably associated with a property of interest, but can additionally and/or alternatively be associated with multiple properties, any/or any other suitable property.

In a first variant, S100 can include determining a widescale measurement that includes multiple properties.

In a second variant, S100 can include determining parcel data associated with the property of interest, and determining a measurement that is isolated to the property of interest using the parcel data (e.g., segmenting the measurement using the parcel data associated with the property of interest; masking the measurement with the parcel data; etc.).

In a third variant, S100 can include determining a measurement that includes the segment depicting the property of interest and its surrounding region (e.g., predetermined distance from the property of interest). In an example, this includes identifying a measurement that encompasses the geographic region associated with a property geocode and/or the parcel boundary.

In a fourth variant, S100 can include determining auxiliary data associated with the property of interest, wherein the auxiliary data is used to determine a condition score.

However, the property data can be otherwise determined.

5.2. Determining a Set of Property Attributes S200.

Determining a set of property attributes S200 functions to determine one or more property attributes for (e.g., descriptive of) a property. The property attributes can be determined from a property data set for the property, which can function to reduce dimensionality of data representative of the property and/or reduce the amount of noise in raw property data. As used herein, the property attributes can be: the attribute itself (e.g., which property descriptors, parameters, and/or variables to consider), the attribute value (e.g., the specific value for a given property's descriptor, parameter, and/or variable), and/or otherwise defined. S200 can additionally function to determine semantic, objective, and/or explainable descriptions of attributes of the property that may be indicative of property condition. In variants, these semantic attribute values can be surfaced to the user to explain the property condition score. However, S200 can have any other suitable functionality. S200 is preferably determined after S100, but can additionally and/or alternatively be performed concurrently with S100, concurrently with S300 (e.g., condition scoring module 200 can also extract attribute values), periodically, randomly, and/or any other suitable time.

Each property attribute is preferably an attribute as described above, but can additionally and/or alternatively be any other suitable attribute. Each property attribute is preferably a condition-related attribute, but can additionally and/or alternatively be any other suitable attribute. Each property attribute can be for a single property, multiple properties, a property component, and/or any otherwise associated. Each property attribute can be discrete, continuous, binary, multiclass, numerical, categorical, and/or otherwise structured.

S200 can include determining one or more property attributes (property attribute set) for the property. The set of property attributes is preferably predetermined and/or fixed (e.g., for all properties), but can alternatively be dynamically determined for each property (e.g., based on the property location, auxiliary property data (e.g., number of beds/baths, tax assessor data, etc.). In a first example, the property attribute set includes only property condition attributes (e.g., roof condition, pool condition, pavement condition, roof defect presence, lawn condition, yard debris, etc.). In a second example, the property attribute set includes property condition attributes and attributes correlated with property condition (e.g., roof age, etc.). In a third example, the property attribute set excludes property condition attributes. However, the property attribute set can include any other set of property attributes.

The values for each property attribute within the property attribute set is preferably determined using one or more attribute modules 100 (e.g., using an attribute model specific to each attribute within the set), but can additionally and/or alternatively be retrieved from a database 400, retrieved from a third-party (e.g., real estate listing service, tax assessor, permits, etc.), determined using a different module, and/or otherwise determined. S200 is preferably determined based on a measurement, a measurement segment (e.g., of the parcel, of a property component, etc.), parcel data, auxiliary data (e.g., property description), and/or otherwise determined. The auxiliary data is preferably auxiliary data as described above, but can additionally and/or alternatively be any other suitable auxiliary data.

In a first variant, S200 can include determining one or more property attributes based on a property component extracted from a measurement of a property. The property component (e.g., roof, pool, lawn, paved surface, etc.) can be extracted using a component detector and/or object detector trained to detect the property component and/or segment out the property component from the property measurement. In a first embodiment, the property component segment is extracted by a segmentation model, wherein the attribute model determines the attribute value based on the component segment (e.g., received from the segmentation model). In a second embodiment, the attribute model determines the attribute value based on the measurement, wherein the attribute model includes attention layers that focus on the property component segment within the measurement. However, the property attribute can be otherwise determined based on the property component.

In a first example, when the property component is a roof, the attributes can include an age of the roof, presence of damage to the roof (e.g., holes, missing roofing material, etc.), and/or any other attribute. In a specific example, the attributes can include a binary yes/no ("1", "0") for each of a set of roof age values, and a binary yes/no ("1", "0") for each roof damage type. Each binary value can be determined by a different attribute model (e.g., a classifier specific to the roof age value or the roof age type), or be determined by a single attribute model (e.g., a classifier) then converted to the binary value (e.g., a single roof age model outputs the roof age, and a second post processing module sets all roof age values to "0" except the value output by the roof age model).

In a second example, when the property component is a driveway, the attributes can include presence of cracks, potholes, tree roots, and/or any other characteristic, type of driveway material, and/or any other suitable attribute.

In a third example, when the property component is vegetation, the attributes can include age of trees, whether or not the vegetation is alive, damage to the vegetation, whether or not the vegetation is overgrown, density of vegetation (e.g., in one or more zones proximal a primary structure), presence of vegetation within one or more zones proximal a primary structure (e.g., binary yes/no), and/or any other suitable attribute.

In a second variant, S200 can include predicting the property attribute values from the property data as a whole (e.g., all the property data, an entire property measurement, an entire measurement segment depicting the property parcel, etc.). In this variant, S200 can be performed using one or more attribute models. Each attribute model is preferably an attribute model as described above, but can additionally and/or alternatively be any other suitable model. Each attribute model can predict a single attribute, multiple attributes, and/or any other suitable number of attributes. Attribute models can be: neural network models, NLP models (e.g., sentiment analysis, keyword analysis/identification, feature extraction, etc.), classification models, and/or any other suitable models. In a first example, an attribute model ingests one or more measurements (e.g., determined in S100), and outputs one or more attribute values for one or more attributes. In a second example, an attribute model ingests one or more property description vectors, and outputs one or more attribute values (e.g., sentiment) for one or more attributes. In this example, each property description vector is extracted from a property description (e.g., from a real estate listing service) using a natural language processing (NLP) model.

In a third variant, S200 can include determining the set of property attributes from the property database 400 (e.g., precomputed), from a third-party database, and/or otherwise determined.

However, the set of property attributes can be otherwise determined.

Figure 3:
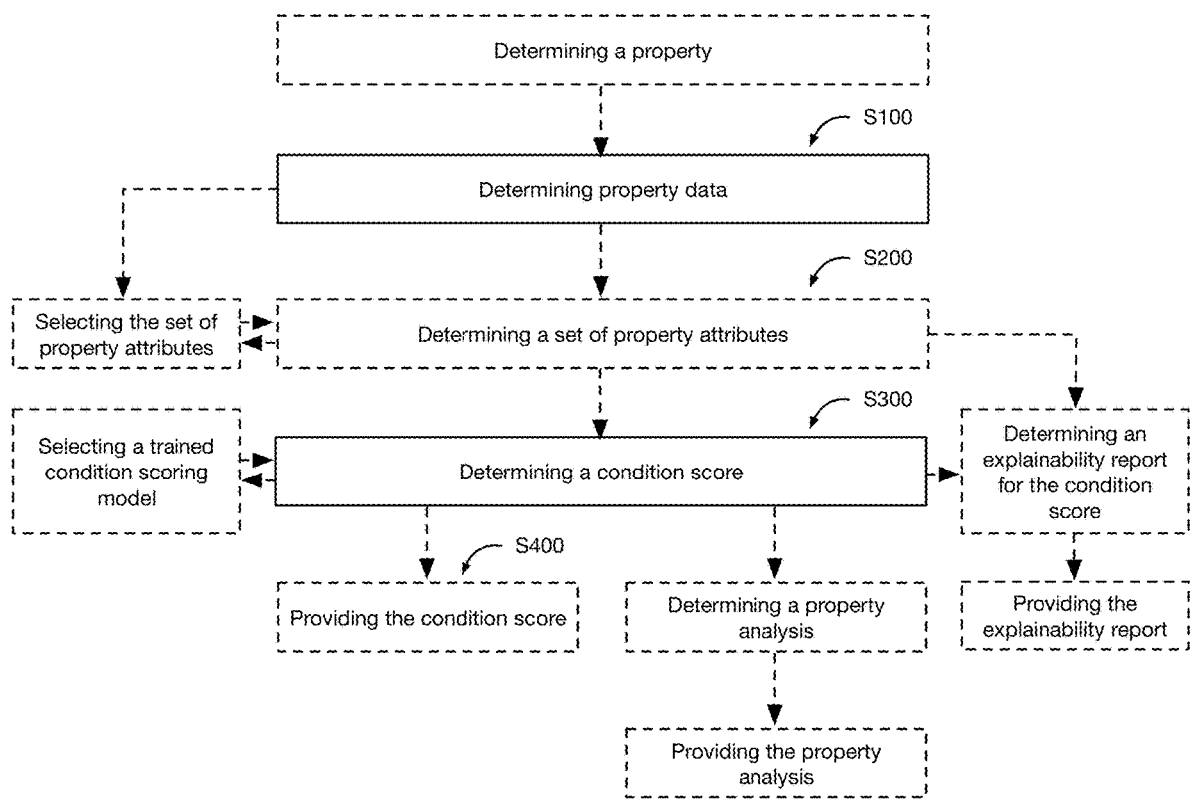
FIG. 3 is an illustrative example of a variant of the method.

S200 can optionally include selecting the set of property attributes; example shown in FIG. 3. The set of property attributes can include: all available attributes, a subset of attributes (e.g., only condition-related attributes, a specific set of attributes, etc.), and/or any other suitable set of attributes. The set of property attributes can be selected manually (e.g., by a user, by a model trainer), automatically (e.g., using LIFT analysis, based on condition scoring module explainability and/or interpretability, based on other property attributes, etc.), and/or otherwise determined. The set of property attributes can be selected before property attribute value determination, after property attribute value determination, and/or at any other time. However, the set of property attributes can be otherwise selected.

S200 can optionally include providing the set of property attributes to an endpoint through an interface. The endpoint can be: an endpoint on a network, a customer endpoint, a user endpoint, an AVM system, a real estate listing service, an insurance system, a property attribute and/or component extraction system, a 3D model building system, and/or any other suitable endpoint. The interface can be: a mobile application, a web application, a desktop application, an API, a database, and/or any other suitable interface executing on a user device, a gateway, and/or any other suitable computing system. However, the set of property attributes can be otherwise provided.

Figure 5A:
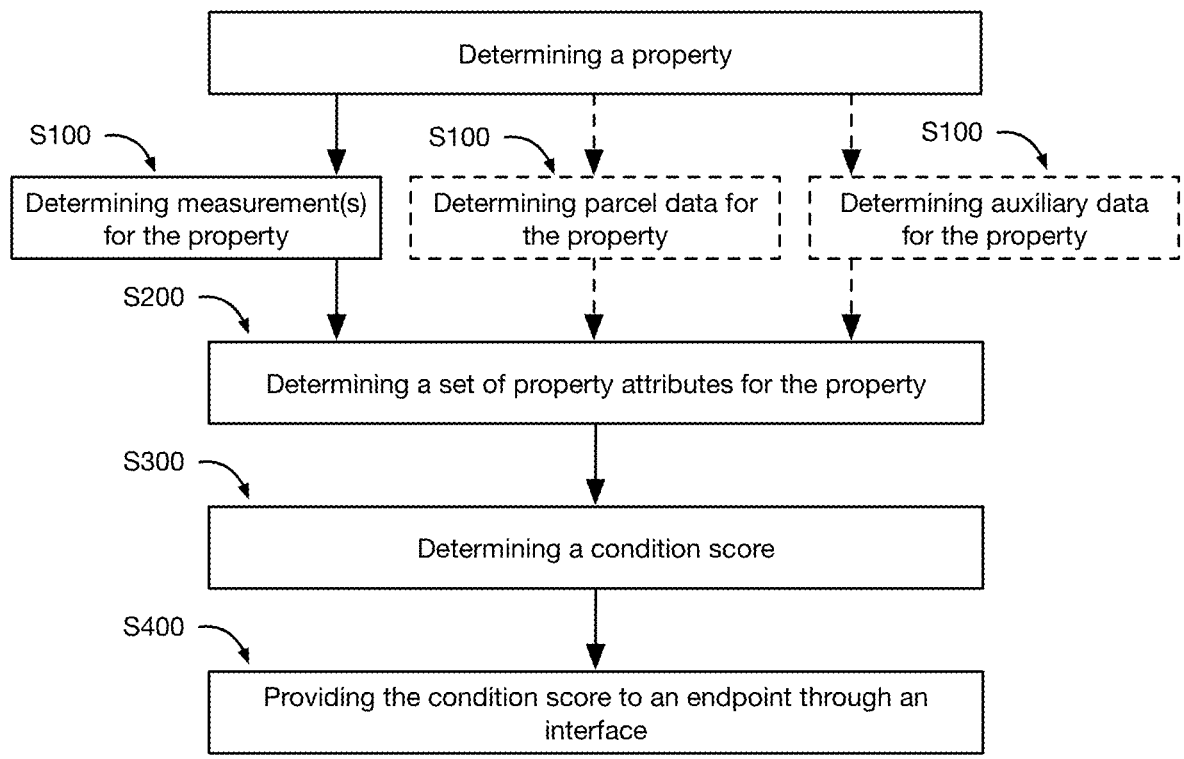
FIGS. 5A-5B are illustrative examples of a variant of the method.
Figure 8B:
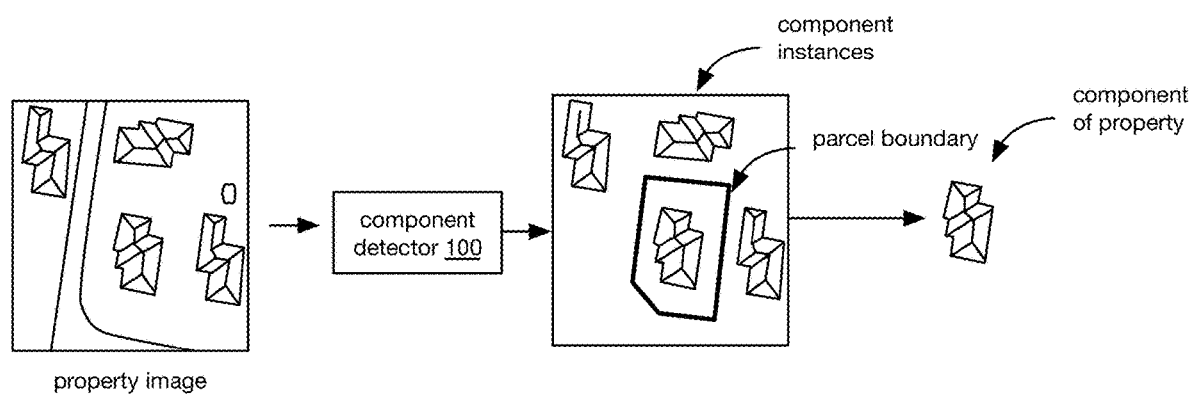

S200 can optionally be performed using parcel data (e.g., parcel boundary, geofence, etc.) for the property; example shown in FIG. 5A. The parcel data can be retrieved from a third-party entity, retrieved from a database 400, inferred using a model, and/or otherwise determined. In a first example, the parcel data can be used as additional information provided to an attribute model (e.g., in a side channel; as additional information to focus the model; etc.) for an attribute module 100. In a second example, the parcel data can be used to identify which detected component instances correspond to a property (e.g., the primary structures, pools, vegetation, etc. associated with an address); example shown in FIG. 8B. In the second example, the parcel data can be used to identify the property's components: before property component segmentation from the measurement (e.g., used to determine the measurement region from which the property component should be segmented), after property component segmentation from the measurement (e.g., used to determine which property component instance corresponds to the property), and/or at any other time. However, the parcel data can be otherwise used.

5.3. Determining a Condition Score S300.

Figure 6:
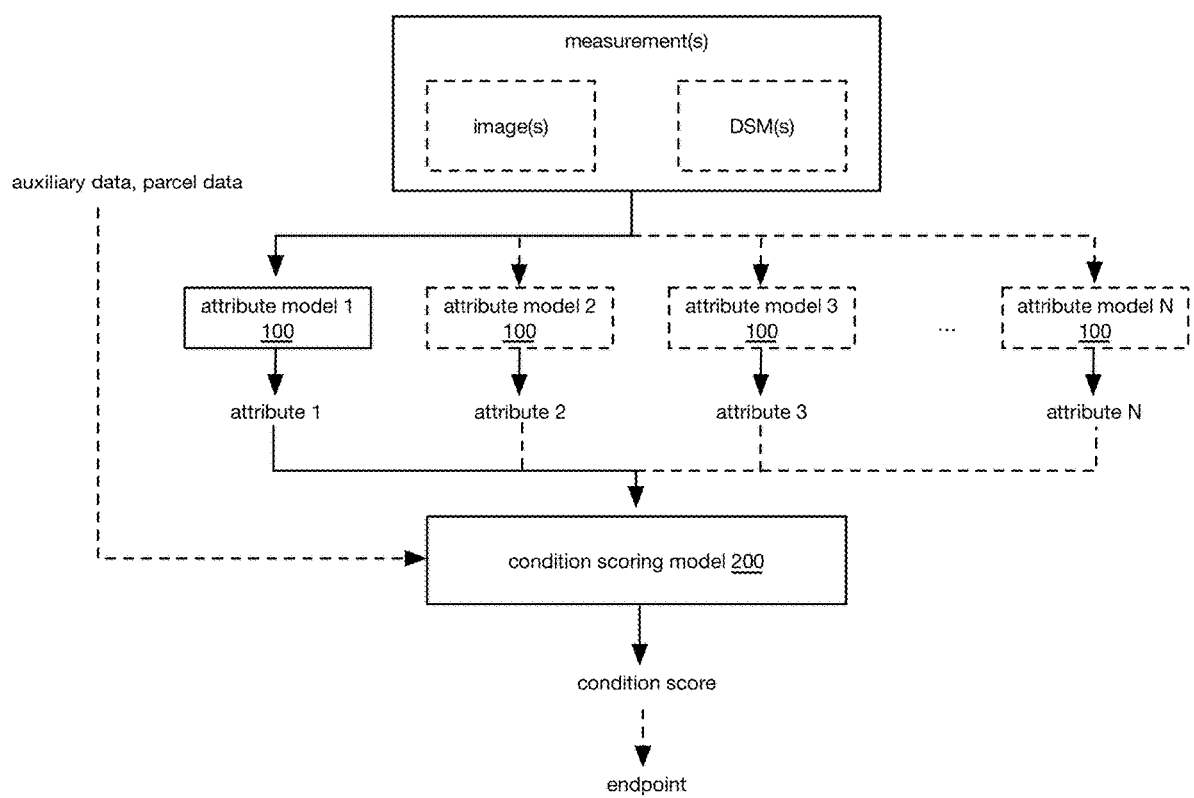
FIG. 6 is an illustrative example of a variant of the method.

Determining a condition score S300 functions to determine a condition score for one or more properties. S300 is preferably performed after S200, but can additionally and/or alternatively be performed concurrently with S200, before S300, periodically, randomly, and/or any other suitable time. The condition score is preferably a condition score as described above, but can additionally and/or alternatively be any other suitable score. The condition score is preferably determined using a condition scoring model from a condition scoring module 200 (example shown in FIG. 6), but can additionally and/or alternatively be determined using an attribute model, and/or any other suitable model. The condition scoring model is preferably trained, but can additionally and/or alternatively be handcrafted, retrieved from a database 400, and/or otherwise determined. The condition score can be determined based on: attribute values for a set of property attributes, the property data set (e.g., used to determine the attribute values), segment of the property data (e.g., a measurement segment, image segment, description snippet, etc.), parcel data, auxiliary property data, historical condition scores for the property (e.g., determined using a prior iteration of the method, manually determined, etc.), and/or otherwise determined.

In a first variant, S300 can include determining a regression model (e.g., the condition scoring model) that defines a weight for each property attribute, scaling each attribute value by the weight, and combining the scaled attribute values. The attribute values can be combined using: multiplication, addition, subtraction, division, and/or otherwise combined. The weights are preferably determined in S500, but can additionally or alternatively be otherwise determined. The attribute values are preferably numeric, but can additionally or alternatively be converted to numeric values when the values are non-numeric (e.g., descriptors or text labels) using a predetermined mapping for each attribute. The resulting numerical condition score can be used directly, be converted to a label (e.g., severe, poor, fair, good, excellent, etc.), and/or otherwise post-processed.

In a second variant, S300 can include determining a classification model (e.g., the condition scoring model) that ingests the attribute values for a property and outputs a condition score. In a first example, an exterior condition score can be determined based on: presence and severity of roof defects, lawn condition, pavement condition, yard debris, pool condition, roof condition, not roof age, and/or any other suitable attribute. Examples of yard debris can include yard debris as disclosed in U.S. patent application Ser. No. 17/502,825 filed on 15 Oct. 2021, which is incorporated in its entirety by this reference. In a second example, an interior condition score can be determined based on: clutter, quality grade, replacement cost, and/or any other suitable attribute.

In a third variant, S300 can include determining a decision tree and/or set of rules or heuristics to determine a condition score. In this variant, the model can include one or more heuristic condition sets, each associated with a predetermined property condition, wherein the property is associated with a predetermined property condition when the property's attribute values satisfy the respective heuristic condition set. In a first illustrative example, when a roof hole and/or roof tarp is detected, the condition score is labelled as "severe." In a second illustrative example, when the number and/or surface area of cracks on a paved surface (e.g., driveway of a property) is less than a threshold proportion (e.g., percentage) or cracks are non-existent, the condition score is labelled as "excellent."

Figure 9:
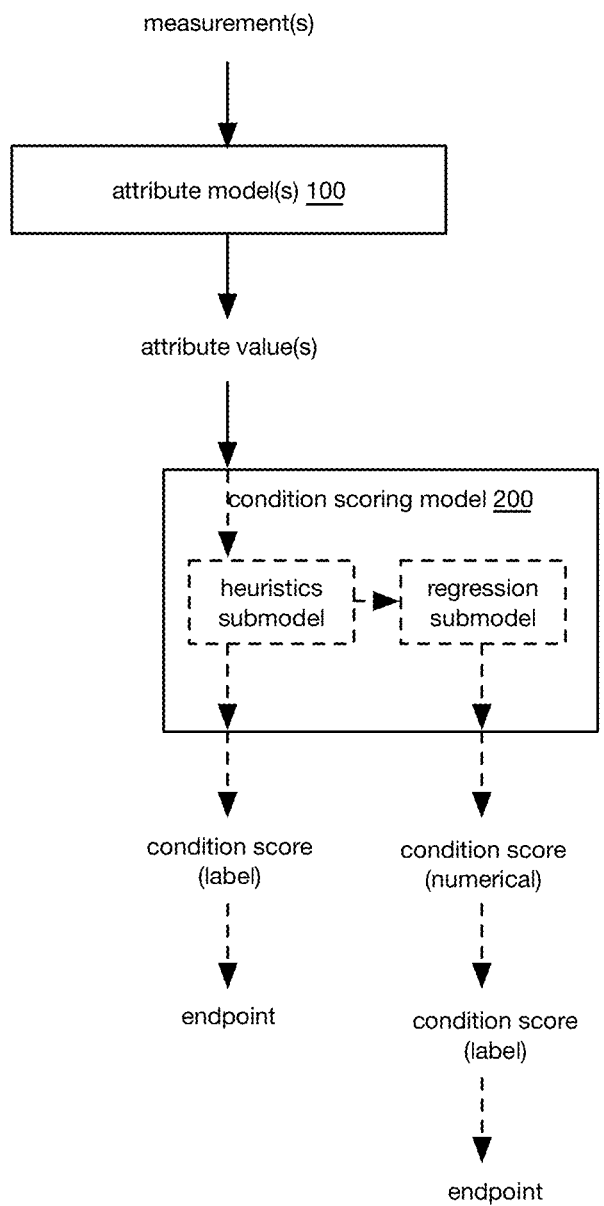
FIG. 9 is an illustrative example of a variant of the method.

In a fourth variant, S300 can include determining a set of submodels (e.g., a hybrid condition scoring model), such as a heuristics submodel and a regression submodel; example shown in FIG. 9. In this variant, the property attribute value set is passed through the heuristics submodel first, wherein the heuristics submodel outputs a predetermined condition score and/or label when the set of property attribute values satisfy the respective set of conditions defined by the heuristics submodel. When the property attribute values do not satisfy any heuristics submodel conditions and/or satisfies a predetermined heuristics submodel condition set, the property attribute values can be passed to the secondary submodel (e.g., a regression submodel), wherein the secondary submodel determines the condition score based on all or a subset of the passed property attribute values. The resultant condition score can optionally be converted to a condition label.

In a fifth variant, S300 can include using a clustering algorithm that ingests the attribute values for a property, the measurement depicting the property, and/or other information associated with the property, and determines which predefined cluster the property attribute values for the property belongs to. The clustering algorithm can assign a condition score to the measurement based on the score assigned to similar properties (e.g., properties of the same cluster, etc.).

Figure 7:
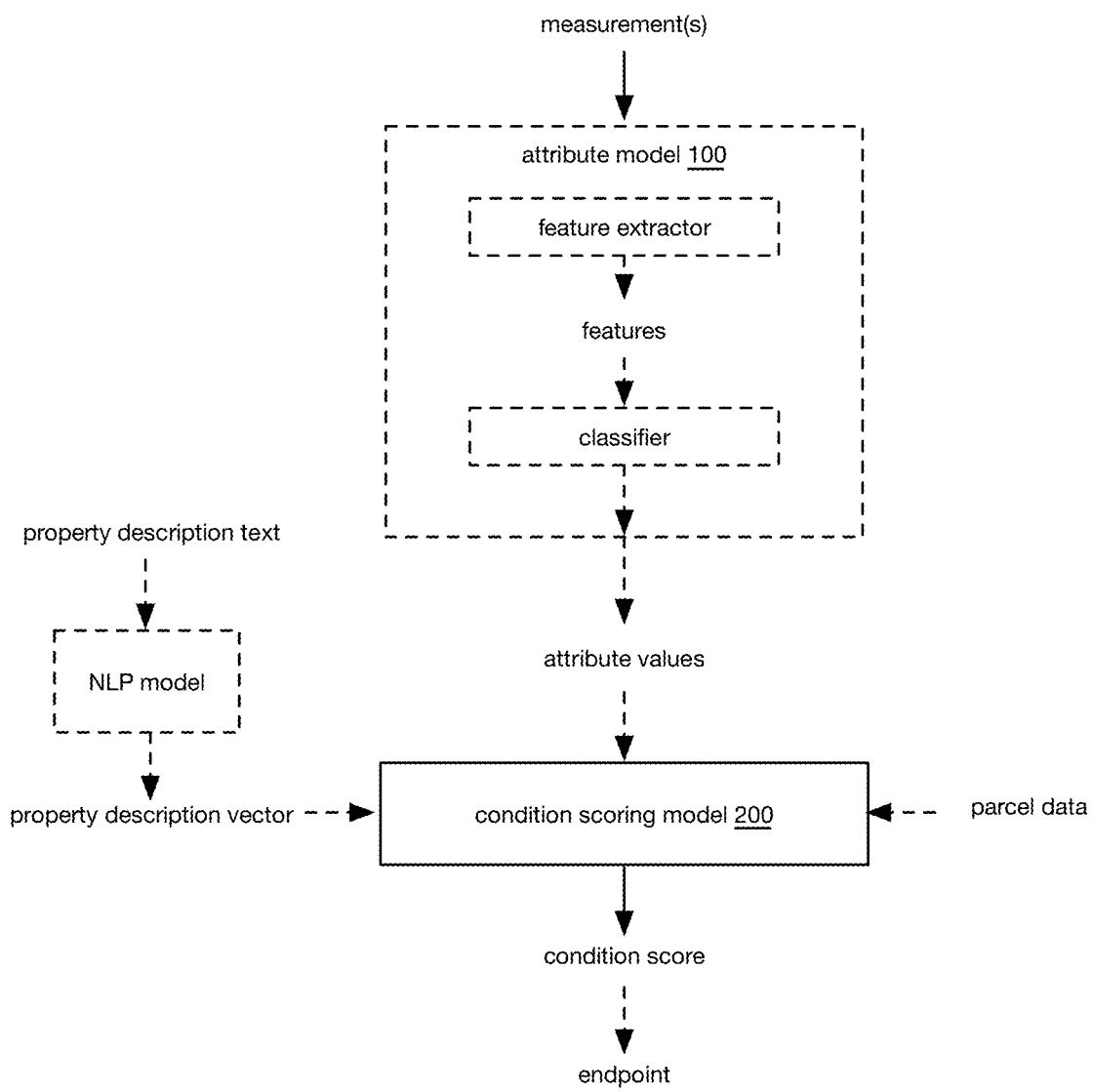
FIG. 7 is an illustrative example of a variant of the method.

In a sixth variant, S300 can include using a condition scoring model that directly ingests the measurement depicting the property and outputs the condition score. The condition scoring model can optionally ingest a property description vector extracted from a property description (e.g., from a real estate listing service) using an NLP model, keywords identified in the property description (e.g., "turn-key", "potential", "as-is"), and/or other attributes extracted from the property description; example shown in FIG. 7.

In a seventh variant, S300 can include aggregating multiple condition scores for the property to determine a final condition score. Condition scores can be aggregated based on: a mean, a mode, a median, a distribution, and/or otherwise aggregated. In a first example, condition scores can be aggregated across a predetermined timeframe (e.g., only condition scores determined from measurements captured within a particular season, only condition scores calculated from the last few months, etc.). In a second example, condition scores can be aggregated across multiple measurements (e.g., different measurement modalities, different measurement perspectives, etc.) from a similar timeframe. In an illustrative example, a first condition score, a second condition score, and a third condition score determined from an orthogonal image, an elevation view image, and a digital surface model, respectively, are aggregated.

However, the condition score can be otherwise determined.

S300 can optionally include selecting a trained condition scoring model, wherein the selected trained condition scoring model can be subsequently used to predict the condition score. The trained condition scoring model can be selected automatically (e.g., by the system), manually (e.g., by a user on an interface), and/or otherwise selected. The trained condition scoring model can be selected based on: a property's attributes and/or attribute values (e.g., different condition scoring models are selected for multifamily properties, single family properties, and commercial properties, etc.), a use case, a geographic region, and/or otherwise selected.

Figure 5B:
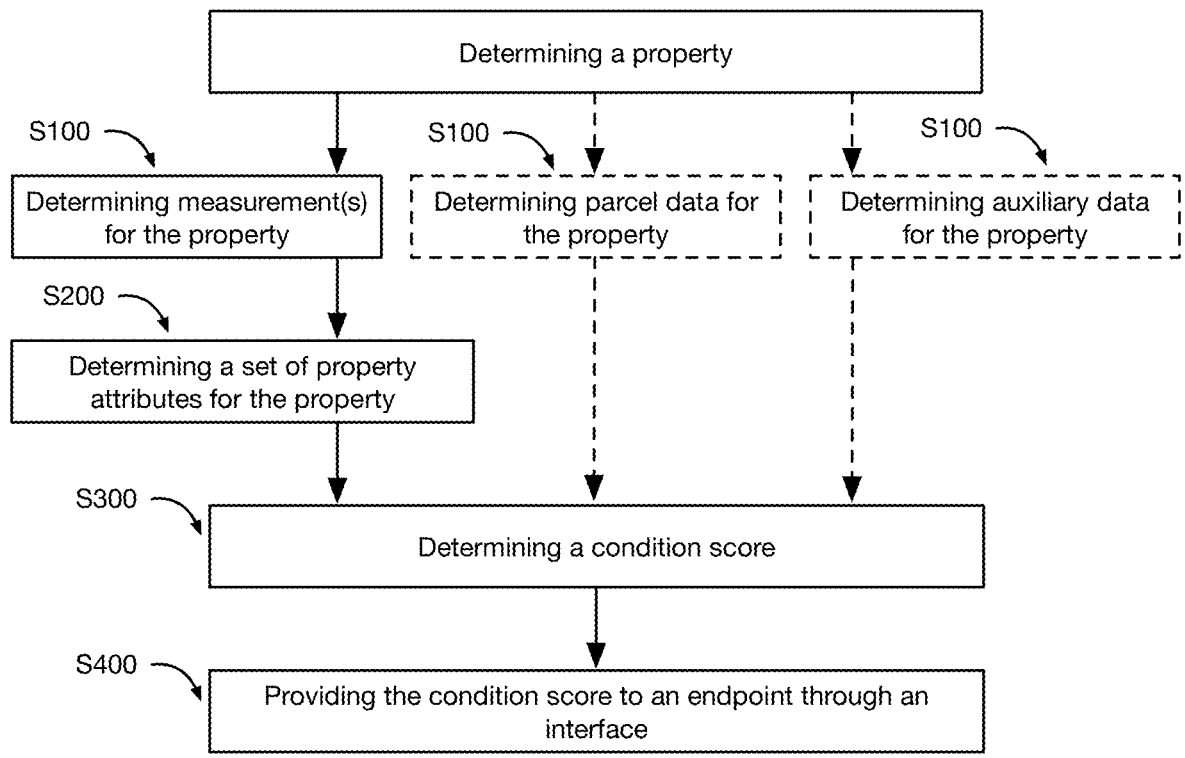

S300 can optionally be performed using parcel data (e.g., parcel boundary, geofence, etc.) and/or auxiliary data (e.g., property description vector), for the property; example shown in FIG. 5B. The parcel data and/or auxiliary data can be retrieved from a third-party entity, retrieved from a database 400, inferred using a model, and/or otherwise determined. In a first example, the parcel data and/or auxiliary data can be used as additional information provided to a condition scoring model (e.g., in a side channel; as additional information to focus the model; etc.) for a condition scoring module 200. In a second example, the parcel data and/or auxiliary data can be used to identify which property corresponds to the predicted condition score (e.g., used to limit the measurement data that is considered, and/or used to determine the property attribute values associated with the property, etc.). However, the parcel data and/or auxiliary data can be otherwise used.

S300 can optionally include converting the condition score into a different format. The condition score can be converted into a different format manually, automatically, and/or otherwise converted. In a first example, the condition score can be converted from a numerical score into a multi-class label (e.g., semantic label). In a second example, the condition score can be converted from a multi-class label to a numerical score. However, the condition score can be otherwise converted.

S300 can optionally include determining an explainability report for the condition score. The explainability report is preferably determined based on the attributes (e.g., determined in S200) for the property, but can additionally and/or alternatively be based on a condition scoring model (e.g., heuristics model) of the condition scoring module 200, auxiliary data, and/or any other suitable property information. In a first example, when the attributes for the property satisfy a set of conditions defined by a heuristics model (e.g., the condition scoring model), the predicted condition score is the condition score corresponding to the satisfied set of conditions, wherein the attribute values that satisfied the set of conditions is used as the explainability report. In a second example, the explainability report can include property attributes that are considered to be influential features (e.g., based on lift, SHAP values, etc.). However, the explainability report can be otherwise determined.

5.4. Providing the Condition Score S400.

Providing the condition score S400 functions to provide the determined condition score to an endpoint through an interface. S400 is preferably performed after S300, but can additionally and/or alternatively be performed concurrently with S300, before S300, periodically, randomly, and/or any other suitable time. The condition score can be an original condition score (e.g., determined in S300), an updated condition score (e.g., determined based on the original condition score), and/or any other suitable value. The endpoint can be: an endpoint on a network, a customer endpoint, a user endpoint, an AVM system, a real estate listing service, an insurance system (e.g., to determine a loan-to-value ratio), a property attribute and/or component extraction system, a 3D model building system, a default model, and/or any other suitable endpoint. The interface can be: a mobile application, a web application, a desktop application, an API, a database, and/or any other suitable interface executing on a user device, a gateway, and/or any other suitable computing system.

However, the condition score can be otherwise provided.

5.5. Training a Condition Scoring Model S500.

Training a condition scoring model S500 functions to determine the condition scoring model (e.g., weights for the condition scoring model) of the condition scoring module 200. S500 is preferably performed before S300, but can additionally and/or alternatively be performed concurrently with S300, after S300, periodically, randomly, and/or any other suitable time. S500 is preferably performed by the computing system 300, but can additionally and/or alternatively be performed by a third-party system.

The condition scoring model can be trained using the same and/or different training data as that used to train the attribute model(s). For example, training data for the condition scoring model includes the same properties as training data for the attribute model(s).

The training data preferably excludes a condition score for each training property, but can alternatively include a condition score for each training property. Training target(s) for the condition scoring model can be: a condition score, a training data metric (e.g., a proxy for a condition score), heuristics, and/or any other suitable training target.

In a first variant, the training target for the condition scoring model can be a condition score (e.g., real estate condition rating C1-C9) associated with each property in the training data. The training data can be generated using a manual labelling pipeline for the condition score and/or for the attributes, be extracted from assessor data (e.g., insurance assessors, etc.), and/or otherwise determined. The human labelers can be instructed to label the condition of a particular property component in a measurement (e.g., condition of the roof; condition of a water component; condition of a paved surface such as a driveway, walkway, etc.; condition of vegetation; etc.), the overall condition of a property, and/or any other task.

In a first embodiment, the labelled training data can be used to train the condition scoring model to predict the condition score (e.g., apply manually determined weights to attributes to determine a single score and train the condition scoring model to determine the manually determined weights) based on the property data (e.g., the measurements) and/or based on property attribute values for the property.

In a second embodiment, the labelled training data can be used to train the condition scoring model based on a known overall condition of the property (e.g., exterior condition, interior condition, both, etc.) to determine a weighting for the property attributes.

Figure 11:
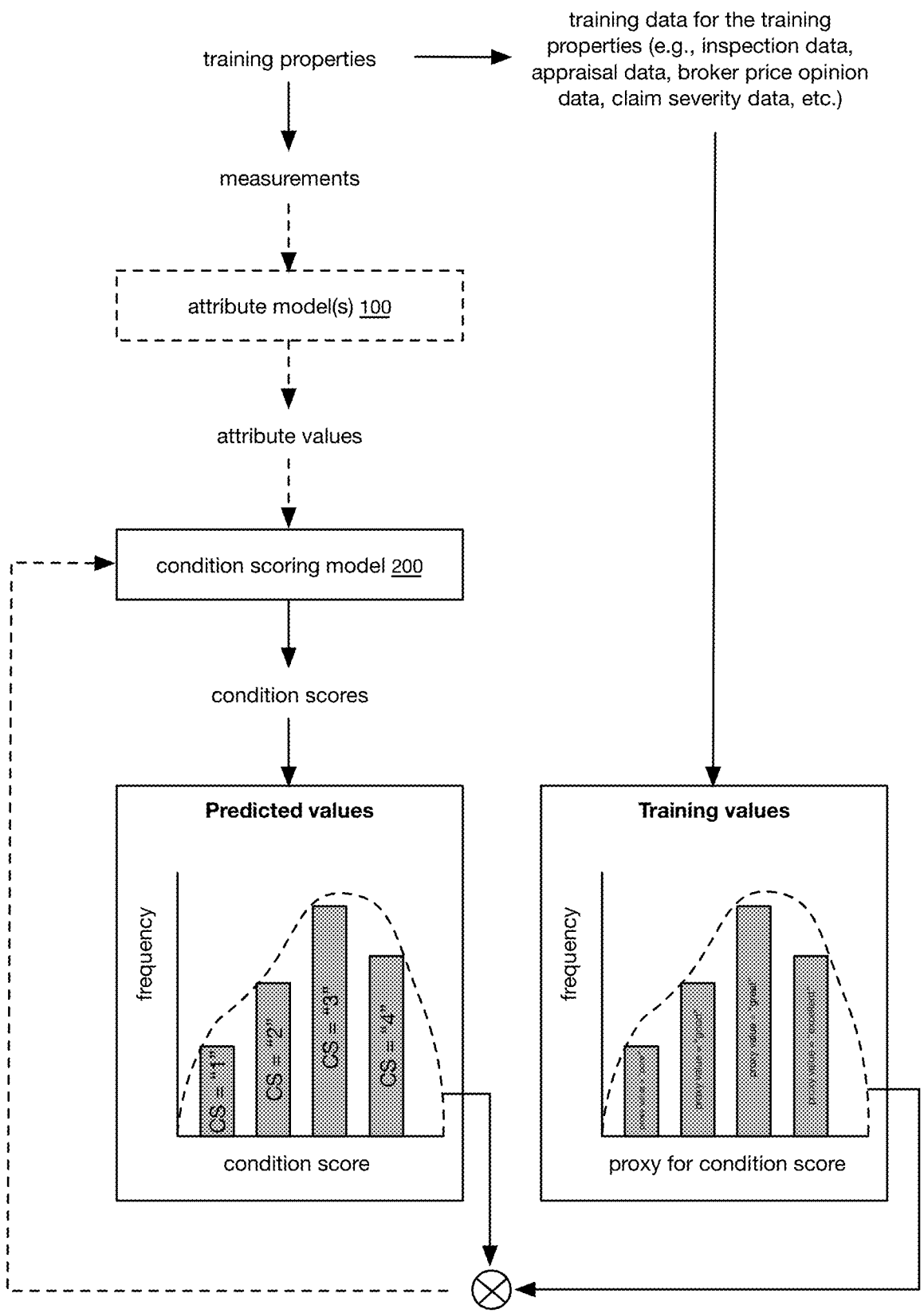
FIG. 11 is an illustrative example of training a condition scoring model.

In a second variant, the training target for the condition scoring model can be a training data metric. The training data metric can be: a correlation, a distribution, and/or any other suitable metric. The training data metric is preferably related to a proxy value for the condition score, but can additionally and/or alternatively be related to the condition score, and/or any other suitable metric. The proxy value for the condition score and/or condition loss score can be: a claim severity score, an insurance loss score, a real estate condition rating C1-C9, an inspection score, a foreclosure probability or rate, a property valuation, and/or any other suitable score. The model can be trained to predict a set of condition scores for a set of properties, wherein the training data metrics are comparable to the training data. In a first example, S500 can include determining whether the predicted condition scores have a similar correlation as the proxy values. In a second example, S500 can include determining whether the distribution of predicted condition scores matches the distribution of proxy values across the training data; example shown in FIG. 11. In a third example, S500 can include binning the properties within the set into a first predetermined set of bins based on the corresponding predicted condition score, binning the properties within the set into a second predetermined set of bins based on the corresponding proxy value, and determining if the properties in comparable bins are the same. In an illustrative example, the condition scoring model can be trained such that the distribution of predicted condition scores for a set of training properties substantially matches the distribution of known claim severities for the set of training properties. In a second illustrative example, the condition scoring model can be trained such that the model predicts a predicted condition score falling within the same or similar population percentile as the claim severity for a given training property. However, the condition scoring model can be otherwise trained on population-level metrics.

Figure 10:
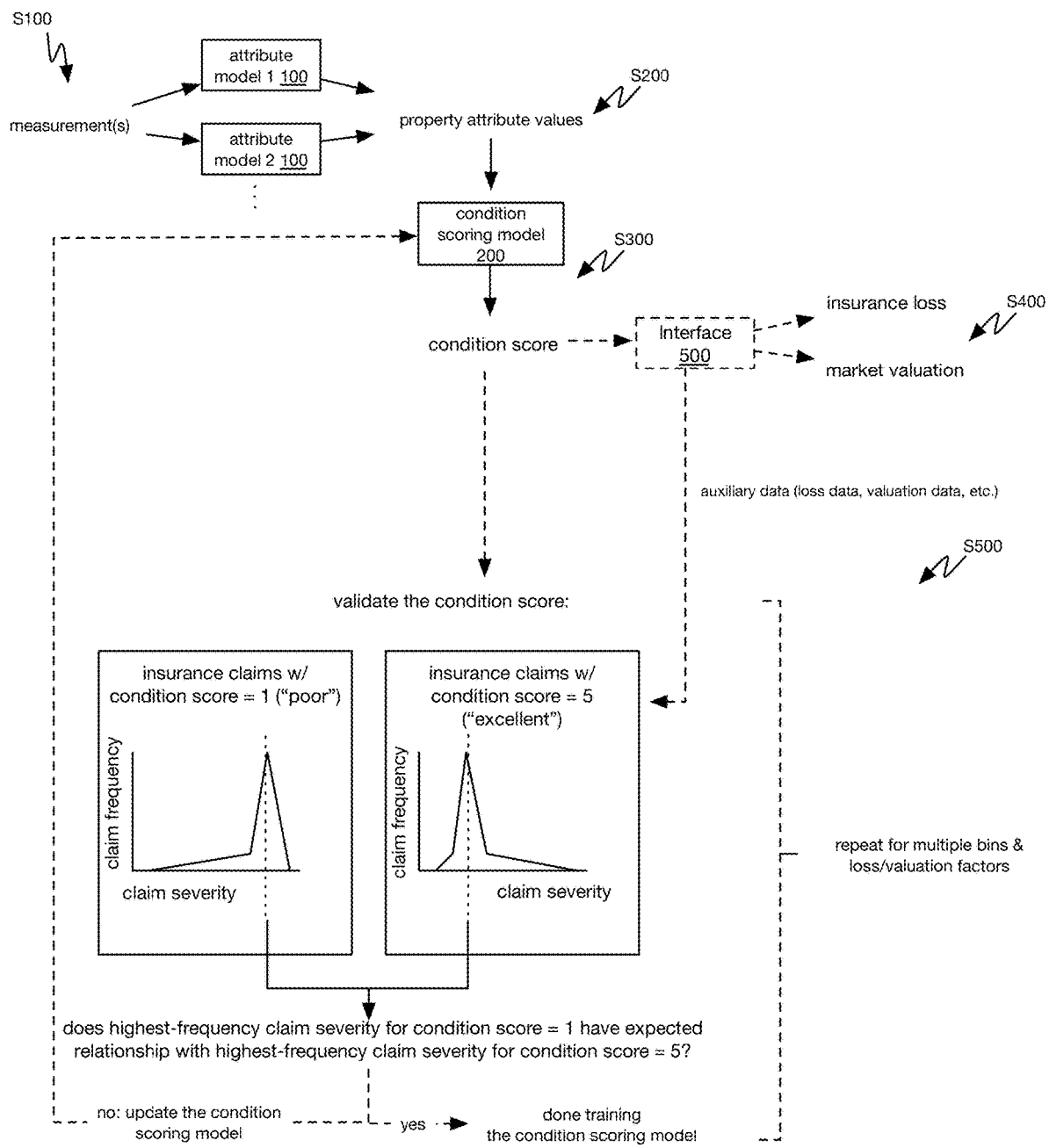
FIG. 10 is an illustrative example of training a condition scoring model.

In a third variant, the condition scoring model can be trained using heuristics. In this variant, S500 can include: binning the properties within the training data into a predetermined set of bins based on the respective condition scores; determining a summary data value for each bin, based on the respective properties' data values (e.g., average loss, average valuation, highest frequency loss value, highest frequency valuation value, loss or valuation distribution, etc.); and comparing the summary data values between the bins (e.g., using heuristics or prior knowledge); example shown in FIG. 10. For example, the loss values for properties with lower-scored condition scores should be higher than the loss values for properties with higher-scored condition scores. In another example, the valuation values for properties with lower-scored condition scores should be lower than the valuation values for properties with higher-scored condition scores.

Training the condition scoring model can include: learning weights, manually assigning weights, iteratively adjusting weights, optimizing weights, randomly determining weights, selecting the property attributes to consider, determining the order in which the property attributes are considered, and/or otherwise trained.

In a first variant, S500 can include determining (e.g., selecting, calculating, etc.) a weight for each attribute, wherein the weight can be a continuous variable. The weights can be within a range (e.g., 0-1, 0-10, 0-100, −1-1, −10-10, −100-100, etc.) or not within a range. The weights can be determined based on heuristics, decision trees, gradient descent, PCA, correlations, industry guidelines (e.g., valuation guidelines), optimizations, bundle adjustments, and/or otherwise determined. The weights can be iteratively determined, calculated, and/or otherwise determined.

In a first embodiment, the weights can be selected using correlations with auxiliary datasets (e.g., insurance loss datasets, claim severity datasets, market value datasets, inspection datasets, appraisal datasets, broker price opinion datasets, etc.). In this embodiment, the condition scores can be calculated based on measurements for the same properties as those appearing in the auxiliary dataset. The measurements are preferably from a timestamp predating or contemporaneous with the data value's timestamp, but can be from another timestamp. In an example, this embodiment can include: determining a set of model weights, performing S100-S300 for each of the properties in the dataset using the model weights, comparing the resultant condition score for the property with the respective data value (e.g., claim severity, insurance loss, property valuation, etc.) in the dataset, and adjusting the weights based on the comparison. The data value is preferably a proxy value for the condition score, but can additionally and/or alternatively be the condition score, and/or any other suitable metric. The proxy value for the condition score and/or condition score can be: a claim severity score, an insurance loss score, a real estate condition rating C1-C9, an inspection score, a property valuation, and/or any other suitable score. Updating the weights can include: randomly adjusting the weights, manually adjusting the weights, iteratively adjusting the weights, optimizing the weights (e.g., based on the comparison or data value-score correlation), and/or otherwise updating the weights.

In a second embodiment, the weights can be selected based on maintenance or repair cost per property component associated with the attribute.

In a third embodiment, the weights can be selected based on the size of the property component associated with the attribute.

In a fourth embodiment, the weights can be selected based on criticality of the property component on structural integrity.

In a fifth embodiment, the weights can be selected based on attribute correlation with value or risk.

In a sixth embodiment, the weights can be determined (e.g., using decision trees, manually, etc.) and validated against indicators. The validation against indicators can include calculating the condition score for a plurality of properties and determining resultant condition score correlation with an indicator value (e.g., an insurance loss score, a property valuation, etc.) and using the correlation to update weights (e.g., if correlation below threshold, above a threshold, within a valid range, etc.). The indicator value can be the same as the proxy value used to train the condition scoring model, or different than the proxy value used to train the condition scoring model.

In a second variant, S500 can include using auxiliary datasets (e.g., insurance loss datasets, claim severity datasets, market value datasets, inspection datasets, appraisal datasets, broker price opinion datasets, etc.) to estimate correlations between an attribute and another indicator (e.g., insurance loss, market valuation, etc.). The correlations can be used to define a set of initial weights that can be refined (e.g., manually, using the correlations to perform gradient descent, etc.).

In a third variant, S500 can include training a condition scoring model to predict a condition score, associated with the property depicted within a measurement, based on the measurement. In a first embodiment, the condition scoring model is trained directly based on the measurement. In a second embodiment, the condition scoring model is trained based on the attribute values extracted from the measurement.

However, the condition scoring model can be otherwise trained.

S500 can optionally include storing the trained model in a database. The database is preferably a database 400 of the system, but can additionally and/or alternatively be a database of a third-party, and/or any other suitable database. However, the trained model can be otherwise stored.

The method can optionally include determining a property analysis based on the condition score and/or a timeseries thereof. Examples of property analyses include: the attribute values, real estate valuations (e.g., estimated based on the condition score and/or one or more attribute values), purchase and/or sale analyses, loan buying and/or selling analyses, timeseries analyses (e.g., property change over time, property change detection, etc.), insurance estimates, claim severity estimates, claim frequency estimates, whether inspectors should be deployed, overall condition estimates, and/or any other suitable property analysis. The same condition score can be used for one or more property analyses, or different condition scores can be used for one or more property analyses. The property analyses can be performed by analysis models (e.g., automated valuation models, etc.), be manually performed, and/or be otherwise performed.

In a first example, determining a property analysis includes: determining a property analysis model; inputting a condition score, optionally one or more attribute values (e.g., determined in S200), optionally one or more uncertainty parameters (e.g., confidence metric for the condition score, confidence metric for an attribute value, etc.), and optionally auxiliary data into the property analysis model; and determining a property analysis and optionally an uncertainty parameter using the property analysis model. The property analysis model can be or include: a neural network (e.g., CNN, DNN, etc.), an equation (e.g., weighted equations), leverage regression, classification, rules, heuristics, instance-based methods (e.g., nearest neighbor), regularization methods (e.g., ridge regression), decision trees, Bayesian methods (e.g., Naïve Bayes, Markov, etc.), kernel methods, probability, deterministics, support vectors, and/or any other suitable model or methodology. The property analysis model can be specific to a use case, or be generic among use cases. The property analysis model can be: an AVM, a model that predicts the probability of default, a model that predicts an insurance loss ratio, and/or any other suitable model.

In a second example, determining a property analysis includes: detecting a condition score change relative to one or more historical condition scores; optionally generating a notification indicating condition score change detection; and running further property analysis (e.g., as described in the first example). The condition score change can be detected based on: an average of all time, a time window from the most recent condition score timestamp, a predetermined time interval, a random time interval, and/or any other suitable time frame. In a first illustrative example, when an improvement in the condition score is detected, a notification is generated and sent to an insurance system (e.g., to notify an insurance company to increase insurance premium) and/or an AVM system. In a second illustrative example, when a decline in the condition score is detected, a notification is generated and sent to an insurance system (e.g., to notify an underwriter to reevaluate a property's risk), a user (e.g., the property owner, such as to mitigate the condition deterioration), an AVM (automated valuation model) system, and/or any other system.

However, the property analysis can be otherwise determined.

6. USE CASES

The condition score can be used to determine: automated valuation model error, insurance loss ratio (e.g., insurance loss divided by premium), and/or any other value. The condition score can be used with: personal and/or commercial lines insurance (e.g., rating, inspection optimization, etc.), real estate property investing (e.g., identify underpriced properties that can increase in value through renovation and/or repairs, incorporate condition score into a valuation model to establish the offer price, etc.), real estate loan trading (e.g., use condition score to evaluate the quality of a loan pool and adjust bid price accordingly; use condition score to identify acute condition issues that can result in removal of a loan from the pool during due diligence; use condition score as an input into a model that predicts probability of default; etc.), real estate mortgage origination (e.g., GSEs can use the condition score to determine whether they will allow a property inspection waiver; originators of non-agency or agency loans can use the condition score as an input into their underwriting criteria; etc.), real estate valuations (e.g., use condition score as an input to an automated valuation model; use condition score as a supplement to a property-level valuation report; etc.), and/or otherwise used.

For example, all or portions of the systems and/or methods described above can be used for automated property valuation, for insurance purposes, and/or otherwise used. For example, any of the outputs discussed above (e.g., for the property) can be provided to an automated valuation model (AVM), which can predict a property value based on one or more of the attribute values (e.g., component values) generated by the one or more models discussed above and/or attribute value-associated information. The property attributes and/or component values can be used to determine: automated valuation model error, automated valuation model accuracy, automated property valuation or price, and/or any other suitable value. The AVM can be: retrieved from a database, determined dynamically, and/or otherwise determined.

The method can optionally include determining explainability and/or interpretability of one or more of the modules discussed above (e.g., the attribute model, the condition scoring model, etc.), wherein the identified attributes (and/or values thereof) can be provided to a user, used to identify errors in the data, used to identify ways of improving the modules, and/or otherwise used. For example, explainability and/or interpretability methods can be used to explain why the condition scoring module 200 predicted the condition score. Explainability and/or interpretability methods can include: local interpretable model-agnostic explanations (LIME), Shapley Additive explanations (SHAP), Ancors, DeepLift, Layer-Wise Relevance Propagation, contrastive explanations method (CEM), counterfactual explanation, Protodash, Permutation importance (PIMP), L2X, partial dependence plots (PDPs), individual conditional expectation (ICE) plots, accumulated local effect (ALE) plots, Local Interpretable Visual Explanations (LIVE), breakDown, ProfWeight, Boolean Rule Column Generation, Generalized Linear Rule Models, Teaching Explanations for Decisions (TED), and/or any other suitable method and/or approach.

All or a portion of the models discussed above can be debiased (e.g., to protect disadvantaged demographic segments against social bias, to ensure fair allocation of resources, etc.), such as by adjusting the training data, adjusting the model itself, adjusting the training methods, and/or otherwise debiased. Methods used to debias the training data and/or model can include: disparate impact testing, data pre-processing techniques (e.g., suppression, apply different weights to instances of the dataset), adversarial debiasing, Reject Option based Classification (ROC), Discrimination-Aware Ensemble (DAE), temporal modelling, continuous measurement, converging to an optimal fair allocation, feedback loops, strategic manipulation, regulating conditional probability distribution of disadvantaged sensitive attribute values, decreasing the probability of the favored sensitive attribute values, training a different model for every sensitive attribute value, and/or any other suitable method and/or approach.

7. ILLUSTRATIVE EXAMPLES

In an illustrative example, the method can include: determining a property of interest (e.g., receiving a request from a user including a property address), determining a measurement or set thereof depicting the property, optionally determining a specified property component for evaluation (e.g., determining a property's roof), and/or determining any other suitable information. The request can be used to determine the measurement. Determining the measurement can include retrieving the measurement using the property address, using the measurement provided in the request, and/or otherwise determining the measurement. One or more attributes can be determined from the measurement and/or from non-visual data (e.g., parcel data, auxiliary data, etc.) associated with the measurement and/or associated with the property depicted in the measurement (e.g., associated with the property address). The one or more attributes can be associated with property components (e.g., built structure, vegetation, pool, paved and/or unpaved surfaces, etc.) and can represent the condition of the property component (e.g., pothole, cracks, overgrown vegetation, damaged structure, damaged surface, etc.). Additionally or alternatively, the attributes can describe property components (e.g., age of vegetation, age of roof of built structure, age of paved surface, price to replace roof, price to replace surface, etc.). The one or more attributes can be determined using one or more attribute models, wherein each attribute model can ingest the measurement and output one or more attribute values. The one or more attributes values can be ingested by a condition scoring model to determine a condition score. The condition score can be returned in response to the request and/or stored in a property database. In variants, the condition scoring model can include a set of submodels, which can be used individually or in combination. The set of submodels can include a heuristics submodel and a regression submodel. The heuristics submodel can ingest the property attribute values and output a condition label only if the property attribute values satisfy any set of conditions defined by the heuristics submodel. The condition label associated with the satisfied set of conditions is the determined condition label. However, if the property attribute values do not satisfy any set of conditions defined by the heuristics submodel, the property attribute values can be ingested by the regression submodel that can output a condition score. The property attribute values ingested by the regression submodel can be the same or different property attribute values ingested by the heuristics submodel. The condition scoring model can optionally generate an explainability report e.g., influential features). The method can optionally include training the condition scoring model. The condition scoring model can be trained on the same or different training data as the one or more attribute models. The condition scoring model can be trained on manually-determined property condition scores and/or proxy values for property condition. In examples, when the condition scoring model is trained on proxy values for property condition, the distribution of predicted condition scores matches the distribution of the proxy values for property condition.

However, the method can be otherwise performed.

Different subsystems and/or modules discussed above can be operated and controlled by the same or different entities. In the latter variants, different subsystems can communicate via: APIs (e.g., using API requests and responses, API keys, etc.), requests, and/or other communication channels.

Different processes and/or elements discussed above can be performed and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various elements discussed above, and/or omit one or more of the discussed elements, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the embodiments of the invention without departing from the scope of this invention defined in the following claims.

We claim:

1. A method, comprising:
    determining, by a processing system, a measurement depicting a property;
    determining, by the processing system, parcel data associated with the property;
    determining, by the processing system, a set of attributes for the property, based on the measurement and the parcel data, using a set of attribute models, wherein determining the set of attributes for the property comprises:
        determining a semantic segmentation mask based on the measurement using a semantic segmentation model comprising a neural network;
        identifying property feature pixels, from the semantic segmentation mask, that share a common parcel, based on the parcel data;
        determining the identified property feature pixels as part of a shared property feature measurement segment corresponding to a property feature; and
        extracting an attribute, based on the property feature segment, using an attribute model; and
    determining, by the processing system, a condition score based on the set of attributes using a condition scoring model, wherein the condition scoring model comprises a first submodel and a second submodel, wherein determining the condition score comprises:
        determining, by the processing system, the condition score using the first submodel when the set of attributes satisfies a set of conditions associated with the condition score; and
        calculating, by the processing system, the condition score using the second submodel when the set of attributes does not satisfy the set of conditions wherein the second submodel is trained based on a comparison between a first distribution of predicted condition scores, predicted by the second submodel for a set of training properties, and a second distribution of proxy values for the set of training properties.

2. The method of claim 1, further comprising determining, by the processing system, a description vector based on a property description using a separate model, wherein the condition score is further determined based on the descriptive vector using the condition scoring model.

3. The method of claim 1, wherein an attribute model of the set determines the respective attribute based on features extracted from the measurement.

4. The method of claim 1, wherein the set of attributes comprises at least one of a roof condition, a pool condition, or yard debris.

5. The method of claim 1, further comprising determining, by the processing system, an explainability description associated with the condition score based on the set of attributes.

6. The method of claim 1, wherein the condition score is used as an input to an automated valuation model.

7. The method of claim 1, wherein the measurement comprises remote exterior imagery.

8. The method of claim 1, wherein determining the set of attributes comprises determining a segmented measurement from the measurement based on the parcel data, wherein an attribute model of the set of attribute models determines a value for an attribute of the set of attributes based on the segmented measurement.

9. The method of claim 1, wherein the first submodel comprises a ruleset model or a heuristics model, and the second submodel comprises a classification model or a regression model.

10. The method of claim 1, wherein an attribute model of the set of attribute models is trained using different training data from the condition scoring model.

11. The method of claim 1, wherein the second submodel is finished training when the first distribution of predicted condition scores matches the second distribution of proxy values.

* * * * *